United States Patent
Arrigoni et al.

(10) Patent No.: US 9,846,974 B2
(45) Date of Patent: Dec. 19, 2017

(54) ABSOLUTE ROTATION ESTIMATION INCLUDING OUTLIER DETECTION VIA LOW-RANK AND SPARSE MATRIX DECOMPOSITION

(71) Applicant: STMicroelectronics S.r.l., Agrate Brianza (FR)

(72) Inventors: Federica Arrigoni, Rho (IT); Beatrice Rossi, Milan (IT); Pasqualina Fragneto, Burago di Molgora (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 428 days.

(21) Appl. No.: 14/562,394

(22) Filed: Dec. 5, 2014

(65) Prior Publication Data
US 2016/0163114 A1 Jun. 9, 2016

(51) Int. Cl.
G06T 19/20 (2011.01)

(52) U.S. Cl.
CPC ...... *G06T 19/20* (2013.01); *G06T 2219/2004* (2013.01); *G06T 2219/2016* (2013.01)

(58) Field of Classification Search
CPC .................................................... G06T 19/20
See application file for complete search history.

(56) References Cited

U.S. PATENT DOCUMENTS

| | | | | |
|---|---|---|---|---|
| 7,831,090 B1* | 11/2010 | Krishnan | ............ | G06K 9/00214 345/419 |
| 2009/0022369 A1* | 1/2009 | Satoh | ...................... | G01B 21/04 382/106 |
| 2010/0172546 A1* | 7/2010 | Sharp | ........................ | G06T 7/70 382/106 |
| 2011/0206274 A1* | 8/2011 | Tateno | ...................... | G06T 7/75 382/154 |
| 2011/0280473 A1* | 11/2011 | Shiba | ................... | G01B 11/002 382/154 |

(Continued)

OTHER PUBLICATIONS

Ash et al, 'Robust System Multiangulation Using Subspace Methods', 2007, Information Processing in Sensor Networks, 2007. IPSN 2007. 6th International Symposium on, pp. 61-68.*

(Continued)

*Primary Examiner* — David F Dunphy
(74) *Attorney, Agent, or Firm* — Seed IP Law Group LLP

(57) ABSTRACT

The present disclosure is directed to systems and methods to perform absolute rotation estimation including outlier detection via low-rank and sparse matrix decomposition. One example method includes obtaining a relative rotation estimates matrix that includes a plurality of relative rotation estimates. The method includes determining values for a low-rank matrix that result in a desirable value of a cost function that is based on a low-rank and sparse matrix decomposition of the relative rotation estimates matrix. The cost function includes the low-rank matrix and a sparse matrix that is nonzero in correspondence of one or more outliers of the plurality of relative rotation estimates. The method includes determining an absolute rotations matrix that includes a plurality of absolute rotations based at least in part on the values of the low-rank matrix that result in the desirable value of the cost function.

27 Claims, 12 Drawing Sheets

(56) References Cited

U.S. PATENT DOCUMENTS

| | | | | |
|---|---|---|---|---|
| 2011/0285590 | A1* | 11/2011 | Wellington | G01C 21/20 342/417 |
| 2013/0064421 | A1* | 3/2013 | Ahuja | G06T 7/20 382/103 |
| 2013/0271578 | A1* | 10/2013 | Richards | G06T 5/006 348/47 |

OTHER PUBLICATIONS

Candes, 'Robust Principal Component Analysis?', 2011, Journal of the ACM (JACM) 58.3 (2011): 11 pages.*

Aire-Nachimson et al., "Global Motion Estimation from Point Matches," *International Conference on 3D Imaging, modeling, Processing, Visualization and Transmission*, 2012, 8 pages.

Arrigoni, "Robust Global Motion Estimation with Matrix Completion," *ISPRS—International Archives of the Photogrammetry, Remote Sensing and Spatial Information Sciences* XL-5:63-70, 2014.

Beck et al., "A Fast Iterative Shrinkage-Thresholding Algorithm for Linear Inverse Problems," *SIAM Journal on Imaging Science* 2(1):183-202, 2009.

Beinat et al., "Generalized Procrustes Analysis for Size and Shape 3-D Object Reconstruction," Optical 3-D Measurement Techniques, Wichmann Verlag, pp. 345-353, 2001.

Benjemaa et al., "A solution for the registration of multiple 3D point sets using unit quaternions," *Proceedings of the European Conference on Computer Vision* 1407:34-50,1998.

Brown et al., "Unsupervised 3D Object Recognition and Reconstruction in Unordered Datasets," *Proceedings of the International Conference on 3D Digital Imaging and Modeling*, Jun. 2005.

Candès et al., "Robust Principal Component Analysis?," *Journal of the ACM* 58(3):11:1-11:37, 2011.

Candès et al., "The Power of Convex Relaxation: Near-Optimal Matrix Completion," *IEEE Transactions on Information Theory* 56(5):2053-2080, 2010.

Chatteijee et al., "Efficient and Robust Large-Scale Rotation Averaging," *International Conference on Computer Vision*, 2013, pp. 521-528.

Crosilla et al., "Use of generalized Procrustes analysis for the photogrammetric block adjustment by independent models," *ISPRS Journal of Photogrammetry & Remote Sensing* 56(3):195-209, 2002.

Enqvist et al., "Non-Sequential Structure from Motion," *Eleventh Workshop on Omnidirectional Vision, Camera Networks and Non-classical Camera*, 2011, 8 pages.

Fischler et al., "Random Sample Consensus: A Paradigm for Model Fitting with Applications to Image Analysis and Automated Cartography," *Communications of the ACM* 24(6):381-395, 1981.

Fusiello et al., "Model Acquisition by Registration of Multiple Acoustic Range Views," *Proceedings of the European Conference on Computer Vision*, pp. 805-819, 2002.

Gherardi et al., "Improving the Efficiency of Hierarchical Structure-and-Motion," *Proceedings of the IEEE Conference on Computer Vision and Pattern Recognition*, pp. 1594-1600, 2010.

Govindu et al., "Combining Two-view Constraints for Motion Estimation," *Proceedings of the IEEE Conference on Computer Vision and Pattern Recognition*, 2001, pp. II-218-II-225.

Govindu, "Lie-Algebraic Averaging for Globally Consistent Motion Estimation," *Proceedings of the IEEE Conference on Computer Vision and Pattern Recognition*, pp. 684-691, 2004.

Govindu,"Robustness in motion averaging," *Proceedings of the Asian Conference on Computer Vision* 3852:457-466, 2006.

Hampel, "The Influence Curve and its Role in Robust Estimation," *Journal of American Statistical Association* 69(346):383-393, 1974.

Hartley et al., "L1 rotation averaging using the Weiszfeld algorithm," *Conference on Computer Vision and Pattern Recognition*, 2011, pp. 3041-3048.

Hartley et al., "Rotation averaging," *International Journal of Computer Vision*, 2013, 42 pages.

Helmke et al., "Essential Matrix Estimation Using Gauss-Newton Iterations on a Manifold," *Internaitonal Journal of Computer Vision* 74(2):117-136, 2007.

Keller, "Closest unitary, orthogonal and Hermitian operators to a given operator," *Mathematics Magazine* 48:192-197, 1975.

Keshavan et al., "Matrix Completion from a Few Entries," *ISIT*, 2009, 30 pages.

Krishnan et al., "Optimisation-on-a-manifold for global registration of multiple 3D point sets," *International Journal of intelligent Systems Technologies and Applications* 3(3/4):319-340, 2007.

Lin et al., "The Augmented Lagrange Multiplier Method for Exact Recovery of Corrupted Low-Rank Matrices," eprint arXiv:1009.055, Oct. 18, 2013, 23 pages.

Lowe, "Distinctive image features from scale-invariant key-points," *International Journal of Computer Vision*, 2004, 28 pages.

Martinec et al., "Robust Rotation and Translation Estimation in Multiview Reconstruction," *Proceedings of the IEEE Conference on Computer Vision and Pattern Recognition*, 2007, 8 pages.

Moulon et al., "Global Fusion of Relative Motions for Robust, Accurate and Scalable Structure from Motion," *International Conference on Computer Vision*, 2013, 8 pages.

Myronenko et al., "On the closed-form solution of the rotation matrix arising in computer vision problems," *CoRR*, 2009, 8 pages.

Ni et al., "HyperSfM" 2011 *International Conference on 3D Imaging, Modeling, Processing, Visualization and Transmission*, pp. 144-151, 2012.

Olsson et al., "Stable Structure from Motion for Unordered Image Collections," *Proceeding of the 17th Scandinavian Conference on Image Analysis (SCIA11)*, pp. 524-535, 2011.

Pennec, "Multiple Registration and Mean Rigid Shapes: Applications to the 3D case," 16th Leeds Annual Statistical Workshop, Leed, UK, pp. 178-185, 1996.

Sharp et al., "Multiview Registration of 3D Scenes by Minimizing Error between Coordinate Frames," *IEEE Transactions on Pattern Analysis and Machine Intelligence* 26(8):1037-1050, Aug. 2004.

Snavely et al., "Photo Tourism: Exploring Photo Collections in 3D," *ACM Transactions on Graphics* 25(3):835-846, 2006.

Strecha et al., "On benchmarking camera calibration and multi-view stereo for high resolution imagery," *Conference on Computer Vision and Pattern Recognition*, 2008, 8 pages.

Sturm, "Using SeDuMi 1.02, a MATLAB toolbox for optimization over symmetric cones," *Optimization Methods and Software*, pp. 525-653, 1999.

Triggs et al., "Bundle Adjustment—A Modern Synthesis," *Proceedings of the International Workshop on Vision Algorithms*, pp. 298-372, 2000.

Waters et al., "SpaRCS: Recovering Low-Rank and Sparse Matrices from Compressive Measurements," *Neural Information Processing Systems (NIPS)*, 2011, 9 pages.

Williams et al., "Simultaneous Registration of Multiple Corresponding Point Sets," *Computer Vision and Image Understanding* 81(1):117-141, Jan. 2001.

Zach et al., "Disambiguating Visual Relationships Using Loop Constraints," *Proceedings of the IEEE Conference on Computer Vision and Pattern Recognition*, 2010, 9 pages.

Zhou et al., "GoDec: Randomized Low-rank & Sparse Matrix Decomposition in Noisy Case," *International Conference on Machine Learning (ICML11)*, New York, NY, USA, pp. 33-40, 2011.

Zhou et al., "Low-Rank Modeling and its Applications in Image Analysis," *CoRR*, 2014, 35 pages.

Zhou et al., "Stable Principle Component Pursuit," *IEEE International Symposium on Information Theory*, pp. 1518-1522, 2010.

* cited by examiner

ABSOLUTE ROTATION ESTIMATION INCLUDING OUTLIER DETECTION VIA LOW-RANK AND SPARSE MATRIX DECOMPOSITION

BACKGROUND

Technical Field

The present disclosure relates to global registration and structure-from-motion and, more particularly, to systems and methods to perform absolute rotation estimation including outlier detection via low-rank and sparse matrix decomposition.

Description of the Related Art

The problem of absolute rotation estimation arises in both global registration of three-dimensional (3D) point sets and in structure-from-motion techniques. Absolute rotation estimation attempts to recover absolute rotations for a set of local reference frames with respect to a global reference frame, given estimates of the relative rotations between attitudes of such local reference frames. For example, the local reference frames can be local coordinates where three-dimensional (3D) points are represented, as typically posed by a 3D point set registration problem, or may be camera reference frames, as typically posed in the context of structure-from-motion.

Global registration (also known as N-view point set registration) consists in finding a rigid transformation that brings multiple 3D point sets into alignment. Global registration can be solved in point space (e.g. through the use of correspondences) or in frame space. Global registration solutions that operate in the point space typically attempt to simultaneously optimize all rotations with respect to a cost function that depends on the distance between corresponding points. On the other hand, global registration solutions that operate in the frame space typically attempt to optimize criteria that are related to the internal coherence of a network of rotations (and translations) applied to the local coordinate frames.

The structure-from-motion problem (also known as block orientation in the context of photogrammetry) consists in recovering both a scene structure, such as 3D scene points, and camera motion, such as absolute positions and attitudes of the cameras. Structure-from-motion methods can be divided into three categories: structure-first, structure-and-motion, and motion-first. Structure-first approaches (e.g. independent models block adjustment) first build stereo-models and then co-register them, similarly to the 3D registration problem. Structure-and-motion techniques (e.g. bundle block adjustment, resection-intersection methods, hierarchical methods, etc.) are the most common and solve simultaneously for both "structure" and "motion."

Finally, motion-first methods first recover the "motion" and then compute the "structure." These motion-first methods are global, as they take into account simultaneously the entire epipolar graph, whose vertices represent the cameras and edges link images having consistent matching points. Most of such approaches solve the structure-from-motion optimization problem in two steps. In the first step, the absolute rotation of each image is computed, and in the second step camera translations are recovered.

Several approaches for performing absolute rotation estimation have been proposed. For example, one proposal distributes the error along all cycles in a cycle basis, while another casts the problem as an optimization of an objective function where rotations are parameterized as quaternions. Another proposed solution uses a gradient descent method based on matrix completion.

However, one main drawback of the global techniques noted above is that they suffer dramatically in the presence of outlying relative rotation estimates. For example, in the structure-from-motion context, repetitive structures or textures in the images cause mismatches which skew the epipolar geometry. In the global registration context, outliers are caused by faulty pairwise registration, which in turn may be caused by insufficient overlap and/or poor initialization.

Thus the above discussed techniques often require a preliminary step to detect and remove outliers prior to computation of the absolute rotations. For example, approaches for identification of outlier epipolar geometries can check for cycle consistency (i.e. deviation from identity) within the epipolar graph.

Importantly, such preliminary outlier detection strategies are known to be computationally demanding and require speed to be balanced against accuracy. For example, approaches based on random sample consensus (RANSAC) suffer from the limitation of increased computational complexity for large-scale datasets. In particular, recent research has shown that outlier removal is the most expensive step within the structure-from-motion pipeline after feature extraction and matching.

Therefore, systems and methods to perform absolute rotation estimation including outlier detection are desired. In particular, computationally-inexpensive techniques to perform absolute rotation estimation including outlier detection are desired.

BRIEF SUMMARY

One aspect of the present disclosure is directed to a computer-implemented method to determine absolute rotations. The method includes obtaining, by one or more computing devices, a relative rotation estimates matrix that includes a plurality of relative rotation estimates. Each of the plurality of relative rotation estimates is an estimate of a relative rotation between attitudes of two of a plurality of local reference frames. The method includes determining, by the one or more computing devices, values for a low-rank matrix that result in a desirable value of a cost function that is based on a low-rank and sparse matrix decomposition of the relative rotation estimates matrix. The cost function includes the low-rank matrix and a sparse matrix that is nonzero in correspondence of one or more outliers of the plurality of relative rotation estimates. The method includes determining, by the one or more computing devices, an absolute rotations matrix that includes a plurality of absolute rotations based at least in part on the values of the low-rank matrix that result in the desirable value of the cost function. Each of the plurality of absolute rotations is a rotation between the attitude of one of the local reference frames and a global reference frame.

Another aspect of the present disclosure is directed to a computer system to determine absolute rotations. The system includes at least one processor and one or more non-transitory computer-readable media storing processor-executable instructions that, when executed by the at least one processor, cause the at least one processor to obtain a relative rotation estimates matrix that includes a plurality of relative rotation estimates. Each of the plurality of relative rotation estimates is an estimate of a relative rotation between attitudes of two of a plurality of local reference frames. The instructions further cause the at least one processor to determine values for a low-rank matrix of rank 3 that result in a desirable value of a cost function that includes the low-rank matrix and a sparse matrix that is nonzero in correspondence of one or more outliers of the plurality of relative rotation estimates. The instructions further cause the at least one processor to determine an absolute rotations matrix comprising a plurality of absolute rotations based at least in part on the values of the low-rank matrix that result in the desirable value of the cost function. Each of the plurality of absolute rotations is a rotation between the attitude of one of the local reference frames and a global reference frame.

Another aspect of the present disclosure is directed to a method to determine absolute rotations. The method includes obtaining, by at least one processor, a relative rotation estimates matrix comprising a plurality of relative rotation estimates. Each of the plurality of relative rotation estimates is an estimate of a relative rotation between attitudes of two of a plurality of local reference frames. The method includes setting, by the at least one processor, a low-rank matrix equal to the relative rotation estimates matrix. The method includes initializing, by the at least one processor, a first sparse matrix to zero. The first sparse matrix is representative of one or more outliers of the plurality of relative rotation estimates. The method includes initializing, by the at least one processor, a second sparse matrix to zero. The second sparse matrix is representative of one or more missing entries from the relative rotation estimates matrix. The method includes performing, by the at least one processor, a plurality of iterations while an iteration continuation condition is satisfied. Each of the plurality of iterations includes assigning, by the at least one processor, to the low-rank matrix a rank-3 approximation of the relative rotation estimates matrix minus the first sparse matrix minus the second sparse matrix. Each of the plurality of iterations includes assigning, by the at least one processor, to the first sparse matrix a result of applying soft thresholding to a projection of the relative rotation estimates matrix minus the low-rank matrix over a sampling set. Each of the plurality of iterations includes assigning, by the at least one processor, to the second sparse matrix a negative of a projection of the low-rank matrix over a compliment of the sampling set.

DETAILED DESCRIPTION

This disclosure presents systems and methods to perform absolute rotation estimation including outlier detection via low-rank and sparse matrix decomposition. In particular, the present disclosure provides novel cost functions that are based on a low-rank and sparse matrix decomposition of a relative rotation estimates matrix. For example, provided cost functions naturally include outliers and/or matrix completion in their definitions. Novel techniques for solving cost function minimization problems, determining absolute rotations from an optimized low-rank matrix, and identifying outlying relative rotation estimates are provided as well.

Figure 1:
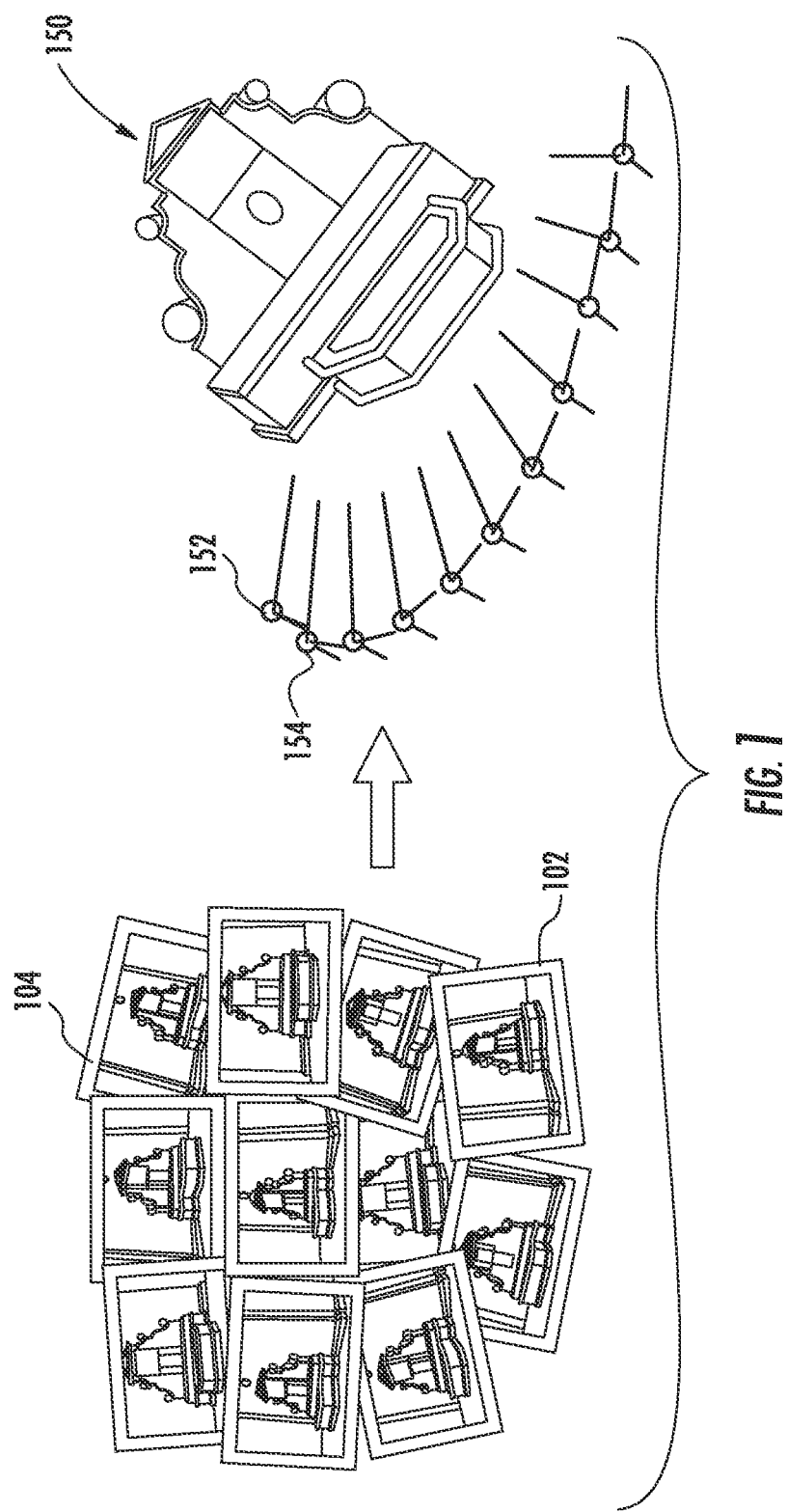
FIG. 1 illustrates the inputs and outputs of a structure-from-motion process, according to an example embodiment of the present disclosure.

FIG. 1 illustrates example inputs and outputs of a structure-from-motion process, according to an example embodiment of the present disclosure. In particular, the goal of structure-from-motion techniques is to recover the absolute location and attitude (i.e. orientation) of each of a plurality of local reference frames (e.g. camera reference frames) relative to a global reference frame.

Although certain aspects of the present disclosure will be discussed with reference to a structure-from-motion pipeline, the present disclosure is not limited to such context. Instead, the present disclosure may be applied to any context in which determination of absolute rotations from relative rotation estimates is desirable, including global registration or other contexts.

Structure-from-motion techniques can take as input a collection of images of a stationary scene. The images can be respectively associated with a plurality of camera reference frames. The internal parameters of the cameras are typically known and provided.

As examples, FIG. 1 illustrates a plurality of images of a scene that includes a fountain. The images include a first image 102 associated with a first camera reference frame and a second image 104 associated with a second camera reference frame.

Performance of the structure-from-motion pipeline can result in the creation of a model 150 of the scene depicted by the images (e.g. a model of the fountain and its surrounding structures). As an example, the model 150 can be a 3D point cloud in which a plurality of points are respectively located at a plurality of locations in 3D space relative to a global origin.

As discussed above, structure-from-motion techniques typically attempt to recover an absolute rotation and translation for each of the camera reference frames. The absolute rotation for each camera reference frame can describe a rotation between the attitude of such camera reference frame and a global reference frame. For example, the absolute rotation can be a rotation matrix that, when applied to the global reference frame, results in the attitude of the camera reference frame. The absolute translation for each camera reference frame can describe a translation between the global origin and the origin of such camera reference frame. For example, the absolute translation can be a translation vector that when applied to the global origin results in the location of the origin of the camera reference frame.

As examples, as shown in FIG. 1, an absolute rotations and translations have been recovered for the camera reference frames associated with the images 102 and 104. In particular, the camera reference frame associated with image 102 is illustrated at 152 relative to the model 150 in the global frame of reference. Likewise, the camera reference frame associated with image 104 is illustrated at 154 relative to the model 150 in the global frame of reference.

Figure 2:
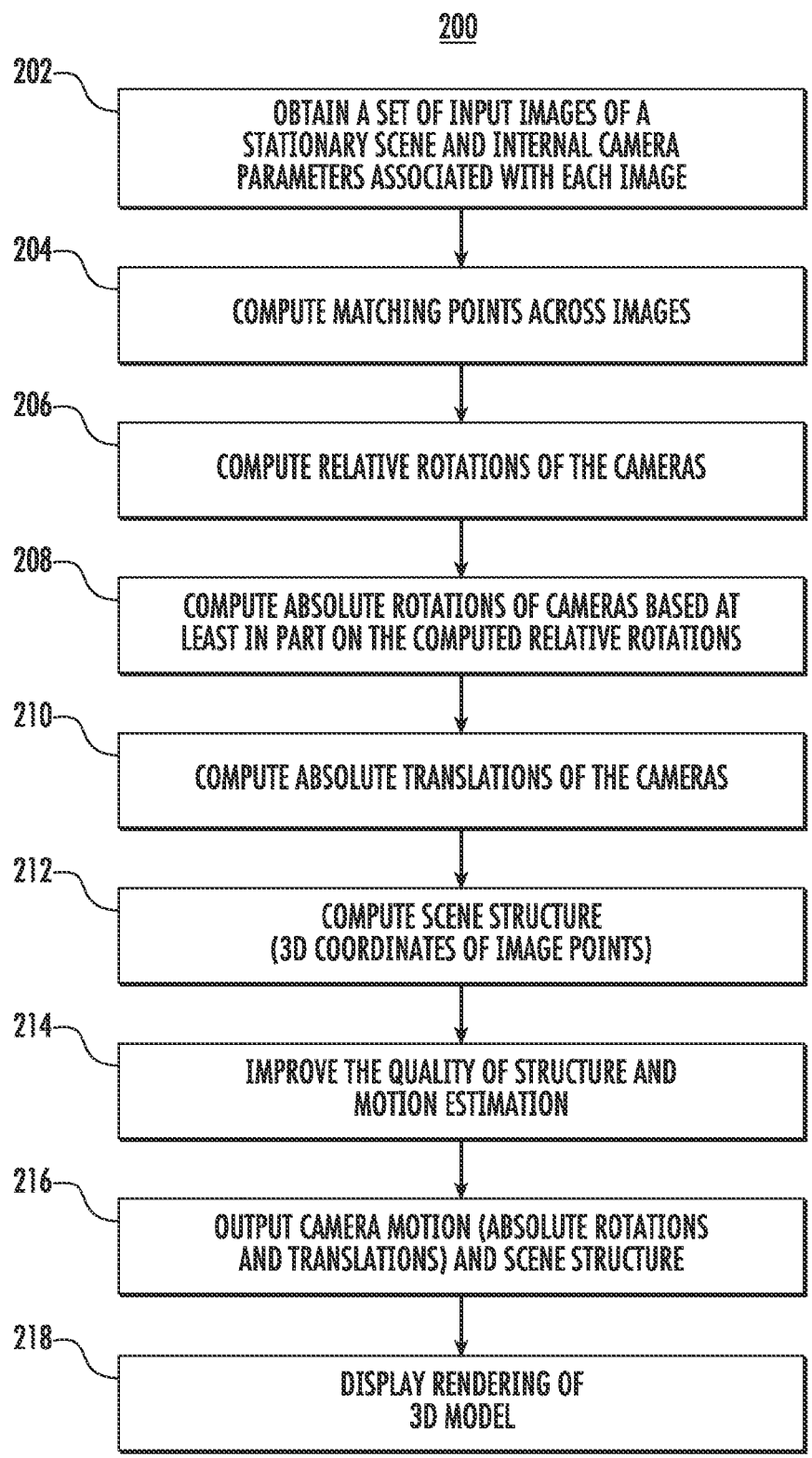
FIG. 2 shows a flow chart diagram of an example structure-from-motion pipeline, according to an example embodiment of the present disclosure.

FIG. 2 shows a flow chart diagram of an example structure-from-motion pipeline 200, according to an example embodiment of the present disclosure. The pipeline 200 begins at 202.

At 202 a set of input images of a stationary scene can be obtained. A set of calibration matrices associated with each image can be obtained at 202 as well. For example, the calibration matrices can be internal camera parameters.

In some implementations, the images are obtained at 202 by a processor implementing the pipeline 200. The images can be retrieved by the processor from a computer-readable medium on which such images are stored as data files.

At 204 matching points can be computed across images. For example, a scale-invariant feature transform (SIFT) technique can be performed to identify matching points for each pair of images obtained at 202. Other techniques can be performed to obtain matching points alternatively or in addition to the SIFT technique.

At 206 a plurality of relative rotation estimates can be computed for the cameras. As an example, essential matrices can be computed using the eight-point algorithm or a RANSAC procedure. In some implementations, the essential matrices are refined by performing essential matrix estimation using Gauss-Newton iterations on a manifold.

Next, the essential matrices can be factorized (e.g. by using singular value decomposition (SVD) techniques) to obtain the relative rotation estimates. In some implementations, the relative rotation estimates are organized into a relative rotation estimates matrix. In particular, estimates $\hat{R}_{ij}$ of the relative rotations may be determined for some pairs of local reference frames (i,j) in a set $\mathcal{N} \subset \{1, \ldots, N\} \times \{1, \ldots, N\}$.

In some structure-from-motion pipelines, RANSAC techniques can be performed to remove outlier rotations at this general stage of the pipeline. However, as noted above, RANSAC techniques are known to be computationally demanding. Therefore, alternative outlier detection strategies, such as those provided by the present disclosure, are desirable. Furthermore, a particular relative rotation estimate can be defined as missing if insufficiently many inliers are found or the chirality constraint is not satisfied.

Figure 3:
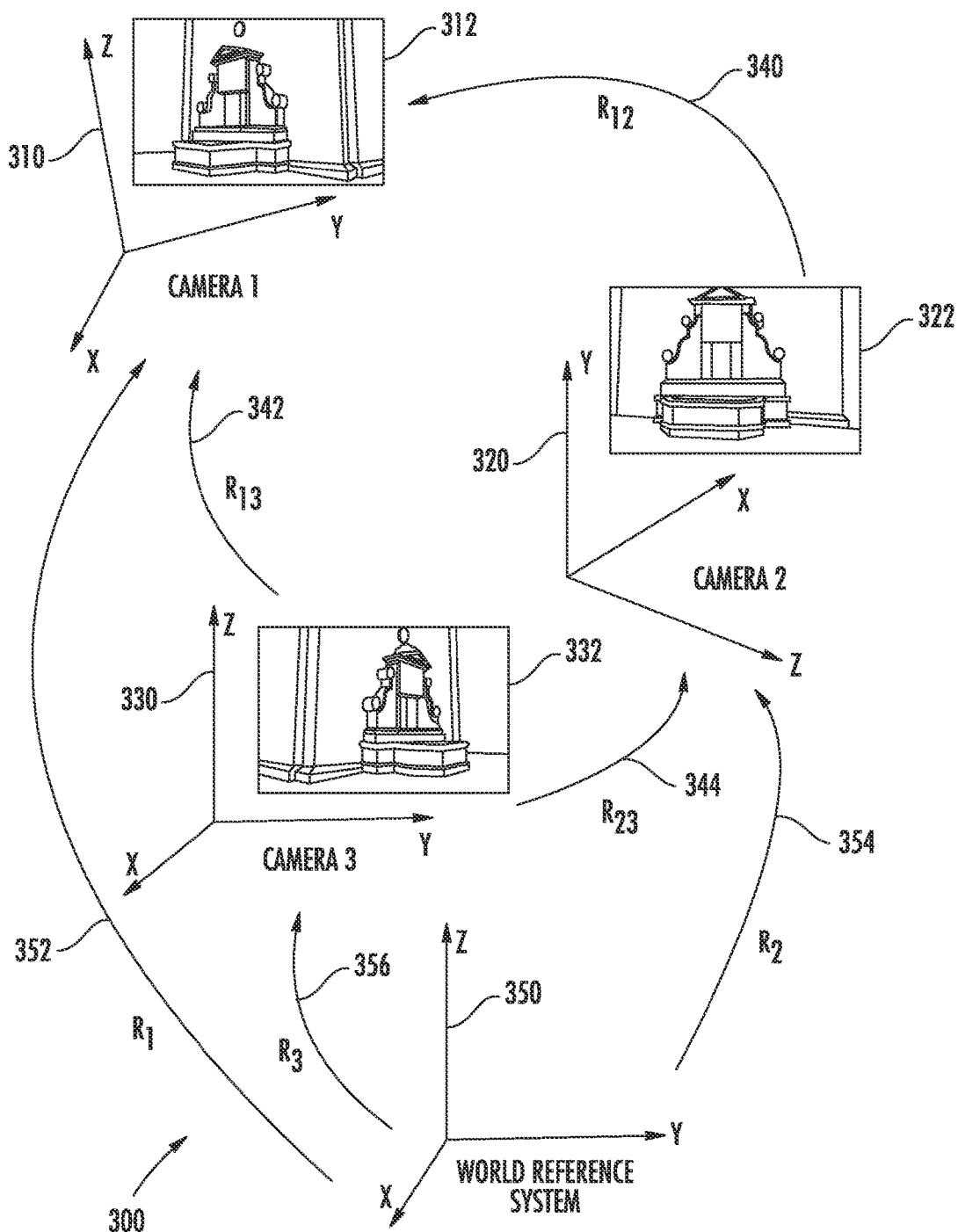
FIG. 3 shows a graphical diagram of relative and absolute rotations for local frames of reference, according to an example embodiment of the present disclosure.

As one example illustration, FIG. 3 shows a graphical diagram 300 of relative and absolute rotations for local frames of reference, according to an example embodiment of the present disclosure. In particular, graphical diagram 300 depicts a first local reference frame 310, a second local reference frame 320, and a third local reference frame 330. The local reference frames 310, 320, and 330 are respectively associated with images 312, 322, and 333.

A first relative rotation between local reference frames 320 and 310 is shown at 340 and can be expressed using the notation $R_{12}$. Likewise, a second relative rotation between local reference frames 330 and 310 is shown at 342 and can be expressed using the notation $R_{13}$. A third relative rotation between local reference frames 330 and 320 is shown at 344 and can be expressed using the notation $R_{23}$.

Generally, the notation $R_{ij}$ may denote the theoretical (i.e. ground truth) relative rotation between a pair of local reference frames (i,j) while the notation $\hat{R}_{ij}$ may denote an estimate of the relative rotation between a pair of local reference frames (i,j) obtained, for example, by factorizing essential matrices, as discussed with reference to block 206 of FIG. 2.

Referring still to FIG. 3, the graphical diagram 300 further shows a global reference frame 350. As discussed above, a goal of the absolute rotation estimation problem is to recover an absolute rotation for each local reference frame 310, 320, 330 with respect to the global reference frame 350. For example, as shown in FIG. 3, a first absolute rotation between the global reference frame 350 and the first local reference frame 310 is shown at 352 can be expressed using the notation $R_1$. Likewise, a second absolute rotation between the global reference frame 350 and the second local reference frame 320 is shown at 354 can be expressed using the notation $R_2$. A third absolute rotation between the global reference frame 350 and the third local reference frame 330 is shown at 356 can be expressed using the notation $R_3$.

Referring again to FIG. 2, at 208 absolute rotations of the cameras can be computed based at least in part on the relative rotations computed at 206. In particular, the absolute rotation estimate problem consists in recovering the absolute rotations $R_1, \ldots, R_N$ in order to satisfy the compatibility constraints $R_{ij} = R_i R_j^T$, where $R_{ij}$ denotes the relative rotation of the pair of local reference frames (i,j).

Thus, estimates of the absolute rotations can be computed at 208 based at least in part on a matrix of estimates of the theoretical relative rotations. For example, estimates $\hat{R}_{ij}$ of the theoretical relative rotations may be available for some index pairs (i,j) in a set $\mathcal{N} \subset \{1, \ldots, N\} \times \{1, \ldots, N\}$. Hereinafter, estimates inferred from the input data are denoted with the hat accent.

Such relative rotation estimates will in general not be compatible. Thus, the goal is to find the absolute rotations such that $\hat{R}_{ij} \approx R_i R_j^T$, resulting in the following minimization problem:

$$\min_{R_i \in SO(3)} \sum_{i,j=1}^{N} \|\hat{R}_{i,j} - R_i R_j^T\|_F^2 \tag{1}$$

where $\|\cdot\|_F$ denotes the Frobenius norm.

According to a key insight of the present disclosure, the minimization problem (1) can be re-cast in terms of a low-rank and sparse matrix decomposition. In particular, the present disclosure provides novel cost functions that are based on a low-rank and sparse matrix decomposition of the relative rotation estimates matrix. Such advantageously results in a robust method which naturally copes with outliers and/or missing data simultaneously.

First, the case where estimates $\hat{R}_{ij}$ of the theoretical relative rotations $R_{ij}$ are available for all i,j=1, ..., N is considered and discussed with reference to FIGS. 4 and 5. The case of missing relative rotations will be considered and discussed further with reference to FIGS. 6 and 7.

Figure 4:
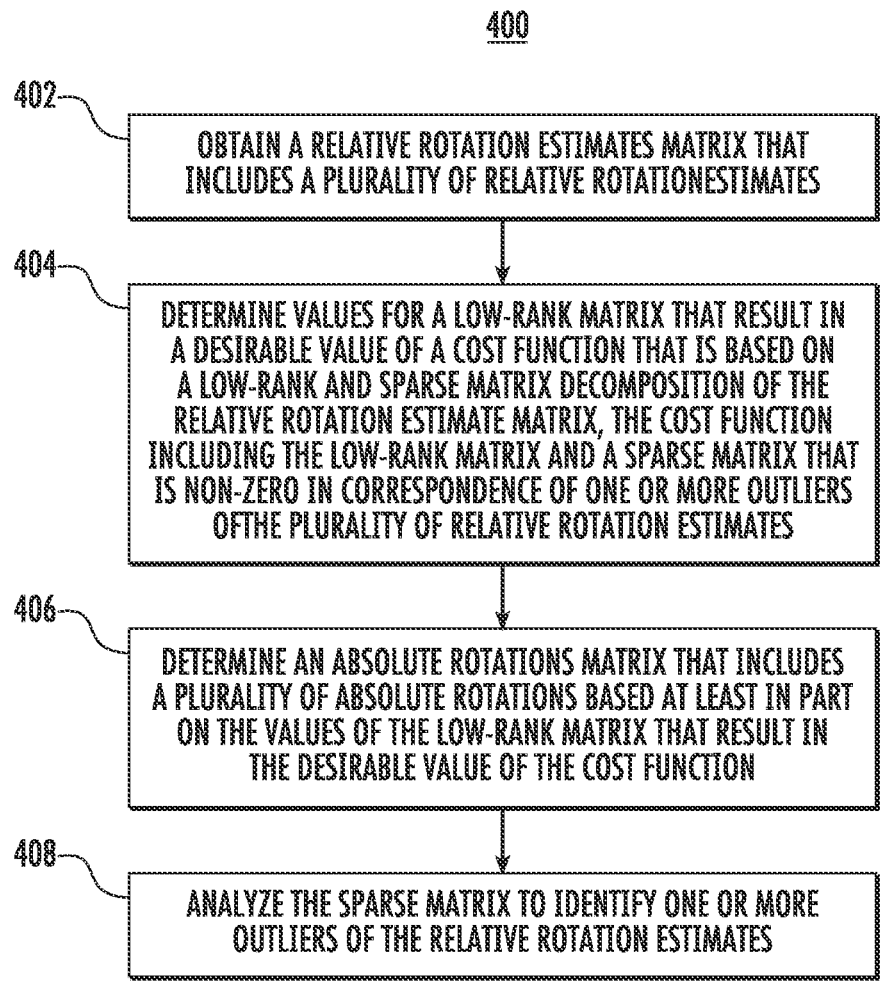
FIG. 4 shows a flow chart of an example method to determine absolute rotations, according to an example embodiment of the present disclosure.

FIG. 4 shows a flow chart of an example method 400 to determine absolute rotations, according to an example embodiment of the present disclosure.

At 402 a relative rotation estimates matrix can be obtained. The relative rotation estimates matrix can include a plurality of relative rotations estimates. Each of the plurality of relative rotation estimates can be an estimate of a rotation between attitudes of two of a plurality of local reference frames.

As an example, let R be a 3N×3 block-matrix containing the absolute rotations and let X be the 3N×3N block-matrix containing the theoretical pairwise rotations, as respectively shown in equations (2) and (3).

$$R = \begin{bmatrix} R_1 \\ R_2 \\ \ldots \\ R_N \end{bmatrix} \quad (2)$$

$$X = \begin{pmatrix} I & R_{12} & \ldots & R_{1N} \\ R_{21} & I & \ldots & R_{2N} \\ \ldots & & & \ldots \\ R_{N1} & R_{N2} & \ldots & I \end{pmatrix} \quad (3)$$

It has been shown that X admits the decomposition $X = RR^T$ and hence it is symmetric, positive semidefinite, and of rank 3. Thus, the optimization problem (1) becomes equivalent to minimizing the error between a matrix X of the relative rotation estimates and the underlying ground truth matrix X. Thus, problem (1) coincides with the problem (4) shown below.

$$\begin{cases} \min_X \|\hat{X} - X\|_F^2 \\ \text{s.t. } X = RR^T, R_i \in SO(3) \end{cases} \quad (4)$$

The formulation of problem (4) implicitly assumes that the data matrix $\hat{X}$ satisfies the properties mentioned above except from an additive noise Z, as shown in equation (5) below.

$$\hat{X} = X + Z \quad (5)$$

In other terms, problem (4) aims at minimizing the noise Z, resulting in a complex multi-variable non-convex optimization problem. Thus, a reasonable approach is to relax some constraints over the variable X to make the computation tractable.

Two example relaxation techniques include the spectral and semidefinite programming relaxations. The former forces the entire columns of R to be orthonormal, instead of imposing orthonormality constraints on each 3×3 block $R_i$. The latter guarantees that the optimization variable X is symmetric positive semidefinite, and covered by identity blocks along its diagonal. Although these solutions can efficiently average noisy orientations, it is well known that they are highly non-robust and that they can give incorrect results in presence of even a single outlier. Such outliers are very frequent when dealing with real data.

As such, the present disclosure provides novel models which naturally cope with the presence of outliers robustly deal with outlying relative rotation estimates and advantageously eliminate the need to perform supplemental, computationally expensive outlier detection techniques.

More precisely, according to an aspect of the present disclosure, a new term S can be added to the equation (5), with the property that S is nonzero in correspondence of the inconsistent relatively rotations only. Moreover, rank relaxation is performed in which the matrix X is enforced to have rank (at most) 3. Such results in the following model:

$$\hat{X} = L + S + Z \quad (6)$$

where L is a rank-3 matrix, S is a sparse matrix containing the outliers and Z is the noise. In particular, the notation L is used in place of X to underline that L will not coincide with X in general, due to rank relaxation.

Equation (6) is an approximated low-rank and sparse matrix decomposition of $\hat{X}$. The associated minimization problem is shown as problem (7) below.

$$\begin{cases} \min_{L,S} \|\hat{X} - L - S\|_F^2 \\ \text{s.t. } \text{rank}(L) \leq 3, S \text{ sparse.} \end{cases} \quad (7)$$

Thus, the cost function of problem (7) intrinsically includes the outliers. With respect to non-robust solutions that rely on a preliminary outlier rejection step, the approach provided by the present disclosure and embodied at problem (7) has a distinct advantage of being intrinsically robust against outliers.

At 404 of FIG. 4, values can be determined for the low-rank matrix that result in a desirable value of a cost function that includes the low-rank matrix and a sparse matrix that is nonzero in correspondence of one or more outliers of the plurality of relative rotation estimates.

As an example, values for the low-rank matrix L that result in a desirable value of the cost function of problem (7) can be determined through a number of different approaches. For example, various solvers can be used to perform the minimization posed by problem (7). Such solvers may employ various techniques or mathematical procedures to solve problems, including, as examples, SVD, bilateral random projections (BRP), soft-thresholding, other techniques, or some combination thereof.

One example technique that may be employed to determine values for the low-rank matrix L that result in a desirable value of the cost function of problem (7) is the GoDec algorithm, shown below as Algorithm 1.

---
Algorithm 1 GODEC
---
Input: X, r, k, ∈
Output: L, S
 Initialize: $L_0 = X$, $S_0 = 0$, t = 0
 while $\|X - L_t - S_t\|_F^2 / \|X\|_F^2 > \in$ do.
  1. t = t+1
  2. Assign the rank-r approximation of $X - S_{t-1}$ to $L_t$ using BRP
  3. Assign the projection onto K of $X - L_t$ to $S_t$, where K is the nonzero subset of the first k largest entries of $|X - L_t|$
 end while
 Return L - $L_t$, S = $S_t$

---

In the present context, the rank r is known and it is equal to 3. However, the value of k is unknown. Therefore, use of the GoDec algorithm requires estimation of the cardinality of the sparse term, which may result in a challenging outlier rejection problem.

As such, the present disclosure provides an alternative, novel algorithm for solving the problem (7) which employs an alternative strategy that does not involve the parameter k.

Figure 5:
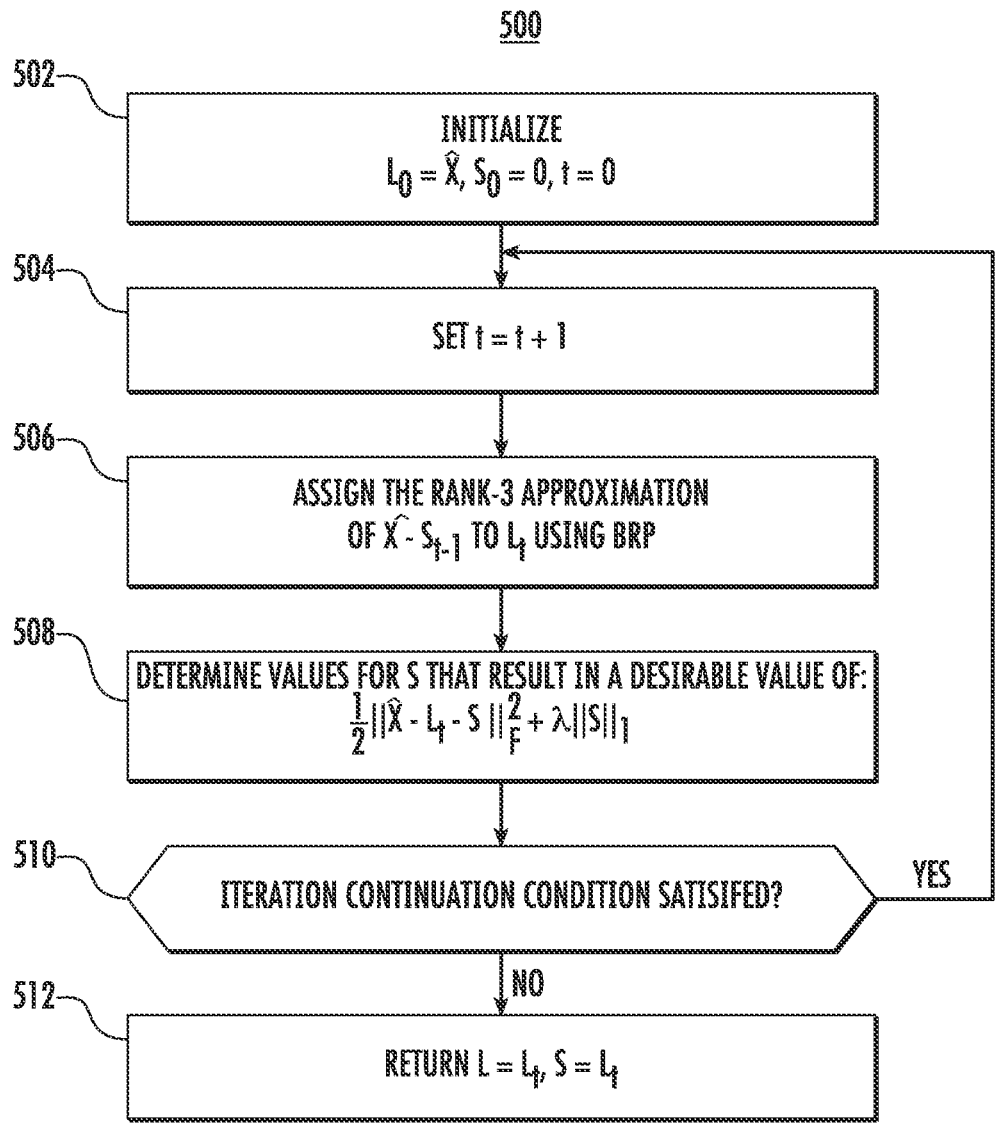
FIG. 5 shows a flow chart of an example method to determine values for a low-rank matrix that result in a desirable value of a cost function, according to an example embodiment of the present disclosure.

In particular, FIG. 5 shows a flow chart of an example method 500 to determine values for a low-rank matrix that result in a desirable value of a cost function, according to an example embodiment of the present disclosure. For example, method 500 of FIG. 5 can be employed to determine values for the low-rank matrix L that result in a desirable value of the cost function of problem (7) (i.e. solve the problem (7)).

At 502 a variable t and a first iteration of the sparse matrix $S_0$ can each be initialized to zero. A first iteration of the low-rank matrix $L_0$ can be initialized to $\hat{X}$.

At 504, t can be set to t+1.

At 506 the rank-3 approximation of $\hat{X} - S_{t-1}$ can be assigned to $L_t$ using a bilateral random projections (BRP) technique.

At 508 values can be determined for $S_t$ that result in a desirable value of a second cost function. For example, the second cost function can be formulated as shown in problem (8):

$$\begin{cases} \min_{L,S}(1/2)\|\hat{X} - L - S\|_F^2 + \lambda\|S\|_1 \\ \text{s.t. } \operatorname{rank}(L) \leq 3 \end{cases} \quad (8)$$

where $\lambda$ is a regularization parameter and $\|S\|_1$ denotes the L1-norm of S viewed as a vector. In some implementations, a coefficient other than (½) can be used (e.g. 1).

Minimizing the L1-norm will, in general, yield a sparse vector. Therefore, the solution of the above problem (8) will recover the sparse pattern of the outlier rotations.

In some implementations, determining values for $S_t$ that result in a desirable value of the cost function of problem (8) can include minimizing the cost function of problem (8) with respect to S while keeping L constant. An analytical solution to such problem may be called soft thresholding or shrinkage and may be expressed as:

$$S_\lambda(\hat{X} - L) = \operatorname{sign}(\hat{X} - L) \cdot \max(0, |\hat{X} - L| - \lambda) \quad (9)$$

where scalar operations on a matrix are applied element-wise.

At 510 it can be determined if an iteration continuation condition is satisfied. For example, the iteration continuation condition may be satisfied if $\|\hat{X} - L_t - S_t\|_F^2 / \|\hat{X}\|_F^2 > \epsilon$.

As another example, the iteration continuation condition may be satisfied if t is less than an iteration stop number, or other conditions or combinations of conditions are met.

If it is determined at 510 that the iteration continuation condition is satisfied, then method 500 returns to 504 and performs an additional iteration. However, if it is determined at 510 that the iteration continuation condition is not satisfied, then method 500 proceeds to 512. Thus, 504-508 are performed iteratively until the iteration continuation condition is no longer met.

At 512, L can be returned as $L_t$ and S can be returned as $S_t$.

Thus, method 500 represents a novel algorithm for determining values for the low-rank matrix L that result in a desirable value of the cost function of problem (7) (i.e. solve the problem (7)). In particular, method 500 avoids the use of the hard thresholding parameter k.

Although method 500 of FIG. 5 has been provided as one novel algorithm to solve the problem (7), other algorithms or solvers may be used as well. For example, in some implementations, method 700 of FIG. 7 can be performed to determine values for the low-rank matrix L that result in a desirable value of the cost function of problem (7) (i.e. solve the problem (7)).

Referring again to FIG. 4, after values are determined for the low-rank matrix that result in the desirable value of the cost function at 404, then at 406 an absolute rotations matrix can be determined based on the values of the low-rank matrix that result in the desirable value of the cost function. The absolute rotations matrix can include a plurality of absolute rotations.

As an example, the absolute rotations can be computed based on the values of L that result in the desirable value of the cost function of problem (7). In particular, since the solution is defined up to a global rotation, corresponding to a change in the orientation of the world coordinate frame, any block-column of L can be used as an estimate of R.

Due to the rank relaxation, each 3×3 block is not guaranteed to belong to the 3D Euclidean rotation group SO(3). Therefore, the nearest rotation matrix (in the Frobenius norm sense) can be found for each 3×3 block by using an SVD technique. In other words, each 3×3 block can be projected onto SO(3) through SVD.

At 408 the sparse matrix can be analyzed to identify one or more outliers of the relative rotations estimates. As an example, the values for the sparse matrix S that result in a desirable value of the cost function of problem (7) can be analyzed to identify one or more outliers.

In particular, although the absolute rotations computed according to method 400 are intrinsically insensitive to outliers, it is beneficial for subsequent steps (e.g. computing translations in a structure-from-motion pipeline) to single out bad relative rotations from the data matrix $\hat{X}$, which are indicators that the whole rigid transformation is probably faulty. Thus, outliers can be identified by analyzing the optimal sparse matrix S, which operates element-wise on $\hat{X}$. Such outliers can be removed or otherwise disregarded when performing one or more downstream operations.

As one example, analyzing the sparse matrix to identify outliers at 408 can include identifying as an outlier each relative rotation estimate $\hat{R}_{ij}$ for which the corresponding 3×3 block in S includes greater than a threshold number of nonzero entries. For example, the threshold number can be 1, 2, 3, etc.

When a relative rotation estimate $\hat{R}_{ij}$ is identified as an outlier, it can be inferred that the originating epipolar geometry (i.e. the whole essential matrix $E_{ij}$) was faulty. Such essential matrix subsumes information not only about the relative rotation estimate $\hat{R}_{ij}$, but also about the relative translation estimate $\hat{t}_{ij}$. Thus, such translation estimate $\hat{t}_{ij}$ may be excluded from downstream operations.

Moreover, since the epipolar geometry is computed using image points, all the corresponding points between the pair of local reference frames (i,j) for each identified outlier can be removed. In other words, all information related to the pair (i,j), such as $\hat{R}_{ij}$, $\hat{t}_{ij}$, and the corresponding points, can be assumed to be wrong and removed. For example, the pair (i,j) can be treated as missing.

Thus, FIGS. 4 and 5 provide novel methods for determining absolute rotations where estimates $\hat{R}_{ij}$ of the theoretical relative rotations $R_{ij}$ are available for all i,j=1, . . . , N. Novel methods of the present disclosure that naturally cope with missing relative rotations will be now be discussed with reference to FIGS. 6 and 7.

Figure 6:
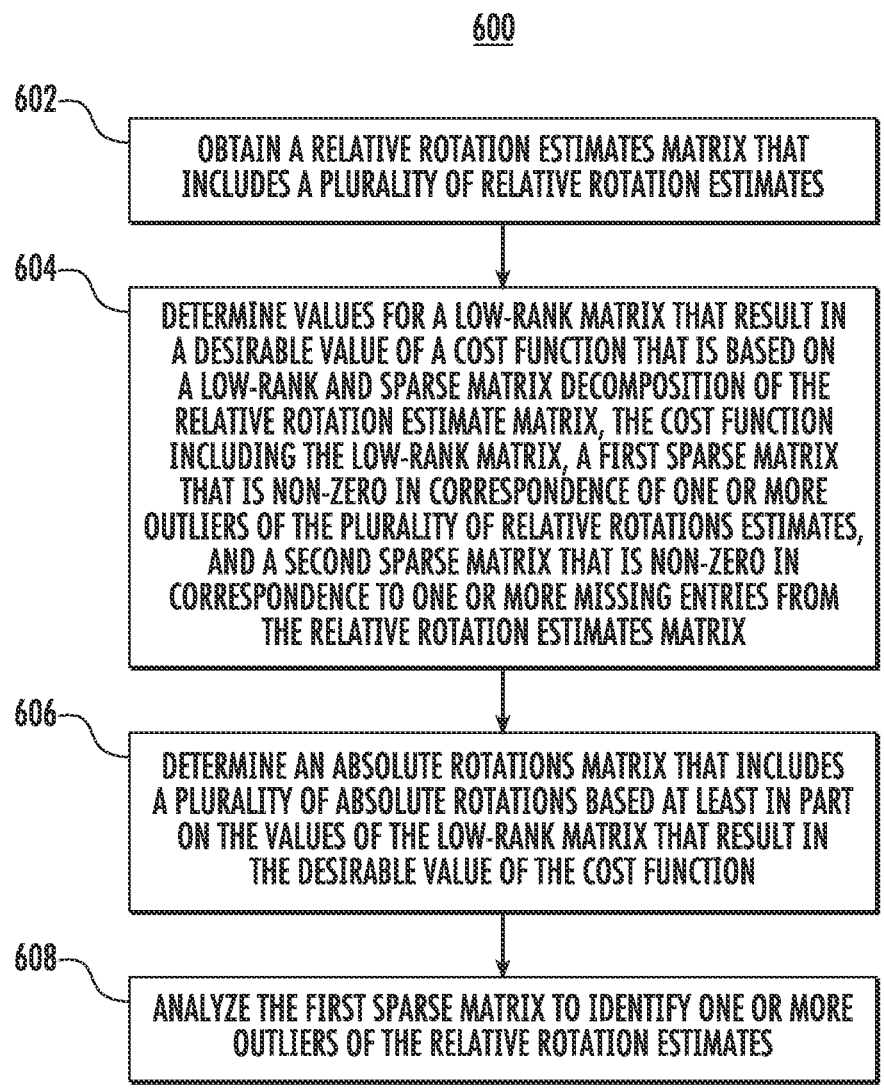
FIG. 6 shows a flow chart of an example method to determine absolute rotations, according to an example embodiment of the present disclosure.

FIG. 6 shows a flow chart of an example method 600 to determine absolute rotations, according to an example embodiment of the present disclosure.

At 602 a relative rotation estimates matrix can be obtained. The relative rotation estimates matrix can include a plurality of relative rotations estimates. Each of the plurality of relative rotation estimates can be an estimate of a rotation between attitudes of two of a plurality of local reference frames.

According to an aspect of the present disclosure, the model (6) can be extended in order to simultaneously cope with both outliers and missing data. In particular, the sparse term in model (6) can be expressed as the sum of two sparse matrices $S_1$ and $S_2$, resulting in the following model.

$$\hat{X} = L + S_1 + S_2 + Z \quad (10)$$

The first sparse matrix $S_1$ is a sparse matrix over a sampling set $\Omega$ representing the outliers in the estimations. The second sparse matrix $S_2$ has support on $\overline{\Omega}$ and is an approximation of $-P_{\overline{\Omega}}(L)$, representing the completion of the missing entries. Thus, equation (10) reduces to (6) over the sampling set, since $S_2$ is zero in $\Omega$. However, out of the sampling set, equation (10) turns to $L+S_2+Z=0$, since both $S_1$ and $\hat{X}$ are zero in $\overline{\Omega}$.

Thus, equation (10) is another approximated low-rank and sparse matrix decomposition of $\hat{X}$. The associated minimization problem is shown as problem (11) below.

$$\begin{cases} \min_{L, S_1, S_2} \|\hat{X} - L - S_1 - S_2\|_F^2 \\ \text{s.t. } \operatorname{rank}(L) \leq 3, \\ \operatorname{supp}(S_1) \subseteq \Omega, S_1 \text{ sparse over } \Omega, \\ \operatorname{supp}(S_2) = \overline{\Omega} \end{cases} \quad (11)$$

The cost function of problem (11) intrinsically copes with both outliers and missing data.

At 604 of FIG. 6, values can be determined for the low-rank matrix that result in a desirable value of a cost function that includes the low-rank matrix, a first sparse matrix that is nonzero in correspondence of one or more outliers of the plurality of relative rotations estimates, and a second sparse matrix that is nonzero in correspondence to one or more missing entries from the relative rotation estimates matrix.

As an example, values for the low-rank matrix L that result in a desirable value of the cost function of problem (11) can be determined through a number of different approaches. For example, various solvers can be used to perform the minimization posed by problem (11). Such solvers may employ various techniques or mathematical procedures to solve problems, including, as examples, SVD, BRP, soft-thresholding, other techniques, or some combination thereof.

One example technique that may be employed to determine values for the low-rank matrix L that result in a desirable value of the cost function of problem (11) is a novel, modified version of the GoDec algorithm provided by the present disclosure and named R-GoDec. R-GoDec is summarized below as Algorithm 2.

---
Algorithm 2 R-GODEC
---

Input: $\hat{X}$, r, $\in$
Output: L, $S_1$, $S_2$
   Initialize: $L_0 = \hat{X}, S_1^0 = 0, S_2^0 = 0$ t = 0
   while $\|\hat{X} - L_t - S_1^t - S_2^t\|_F^2 / \|\hat{X}\|_F^2 \ge \in$ do
    1.  t = t+1
    2.  Assign the rank-r approximation of $\hat{X} - S_1^{t-1} - S_2^{t-1}$ to $L_t$ using BRP
    3.  Assign $S_\lambda (P_\Omega (\hat{X} - L_t))$ to $S_1^t$
    4.  Assign $-P_{\overline{\Omega}}(L_t)$ to $S_2^t$
   end while
   Return L = $L_t$, $S_1 = S_1^t$, $S_2 = S_2^t$

---

Figure 7:
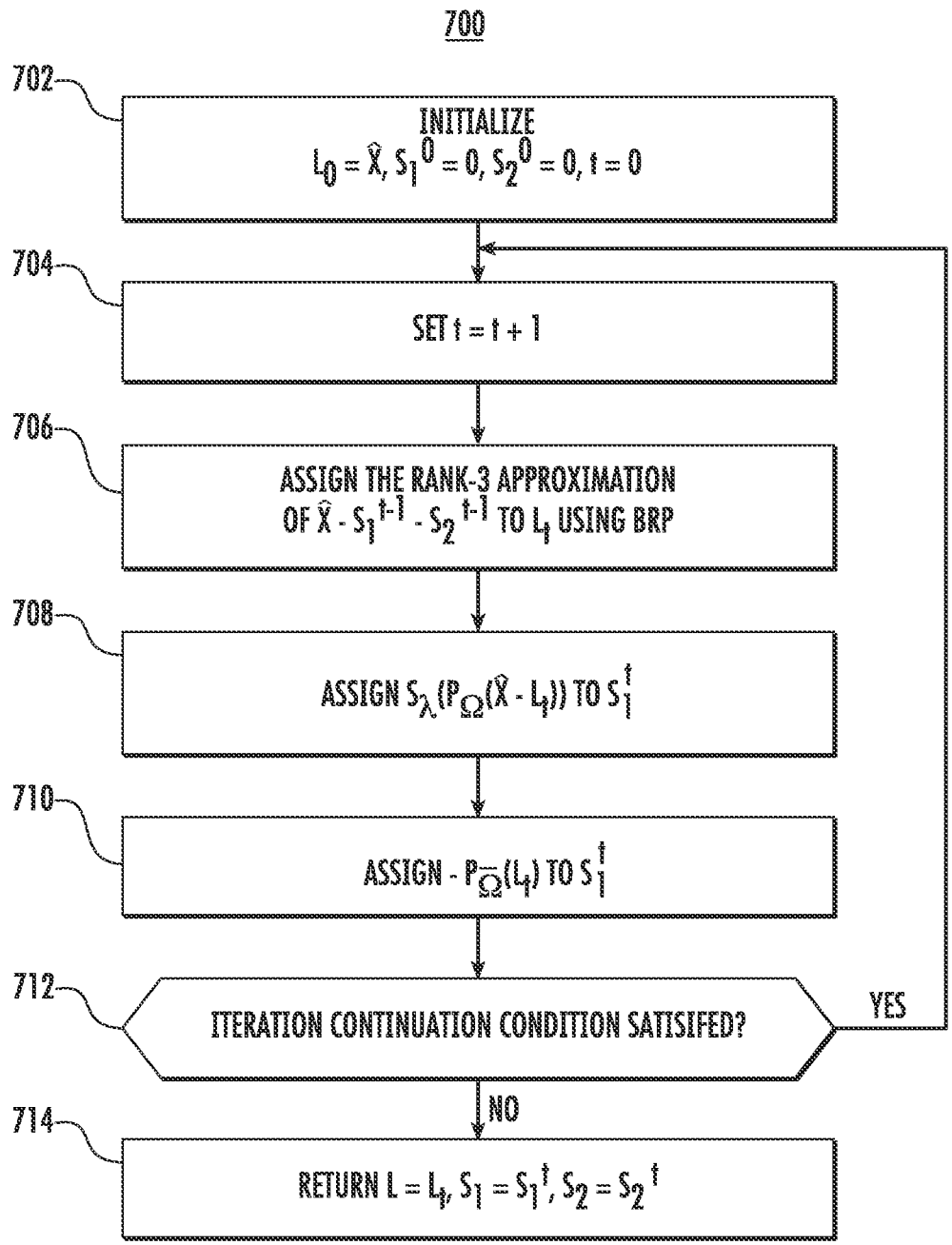
FIG. 7 shows a flow chart of an example method to determine values for a low-rank matrix that result in a desirable value of a cost function, according to an example embodiment of the present disclosure.

An example application of the R-GoDec algorithm to determine values for the low-rank matrix L that result in a desirable value of the cost function of problem (11) is shown in FIG. 7.

FIG. 7 shows a flow chart of an example method 700 to determine values for a low-rank matrix that result in a desirable value of a cost function, according to an example embodiment of the present disclosure. For example, method 700 of FIG. 7 can be employed to determine values for the low-rank matrix L that result in a desirable value of the cost function of problem (11) (i.e. solve the problem (7)).

At 702 a variable t, a first iteration of the first sparse matrix $S_1^0$, and a first iteration of the second sparse matrix $S_2^0$ can each be initialized to zero. A first iteration of the low-rank matrix $L_0$ can be initialized to $\hat{X}$.

At 704, t can be set to t+1.

At 706 a rank-3 approximation of $\hat{X} - S_1^{t-1} - S_2^{t-1}$ can be assigned to $L_t$ using BRP.

At 708, $S_\lambda(P_\Omega(\hat{X} - L_t))$ can be assigned to $S_1^t$.

At 710, $-P_{\overline{\Omega}}(L_t)$ can be assigned to $S_2^t$.

At 712 it can be determined if an iteration continuation condition is satisfied. For example, the iteration continuation condition may be satisfied if $\|\hat{X} - L_t - S_1^t - S_2^t\|_F^2 / \|\hat{X}\|_F^2 > \epsilon$.

As another example, the iteration continuation condition may be satisfied if t is less than an iteration stop number, or other conditions or combinations of conditions are met.

If it is determined at 712 that the iteration continuation condition is satisfied, then method 700 returns to 704 and performs an additional iteration. However, if it is determined at 712 that the iteration continuation condition is not satisfied, then method 700 proceeds to 714. Thus, 704-710 are performed iteratively until the iteration continuation condition is no longer met.

At 714, L can be returned as $L_t$ and $S_1$ can be returned as $S_1^t$, and $S_2$ can be returned as $S_2^t$.

Thus, method 700 represents a novel algorithm for determining values for the low-rank matrix L that result in a desirable value of the cost function of problem (11) (i.e. solve the problem (11)). In particular, method 700 avoids the use of a hard thresholding parameter k.

Referring again to FIG. 6, after values are determined for the low-rank matrix that result in the desirable value of the cost function at 604, then at 606 an absolute rotations matrix can be determined based on the values of the low-rank matrix that result in the desirable value of the cost function. The absolute rotations matrix can include a plurality of absolute rotations.

More precisely, the absolute rotations can be computed based on the values of L that result in the desirable value of the cost function of problem (11). For example, as discussed with respect to 404 of FIG. 4, any block-column of L can be used as an estimate of R. Likewise, the nearest rotation matrix (in the Frobenius norm sense) can be found for each 3×3 block by using an SVD technique. In other words, each 3×3 block can be projected onto SO(3) through SVD.

At 608 the first sparse matrix can be analyzed to identify one or more outliers of the relative rotations estimates. More precisely, the values for the first sparse matrix $S_1$ that result in a desirable value of the cost function of problem (11) can be analyzed to identify one or more outliers.

In particular, as discussed with respect to 408 of FIG. 4, analyzing the sparse matrix to identify outliers at 608 can include identifying as an outlier each relative rotation estimate $\hat{R}_{ij}$ for which the corresponding 3×3 block in $S_1$ includes greater than a threshold number of nonzero entries. For example, the threshold number can be 1, 2, 3, etc.

As a further example, when a relative rotation estimate $\hat{R}_{ij}$ is identified as an outlier, it can be inferred that the originating epipolar geometry (i.e. the whole essential matrix $E_{ij}$) was faulty. Such essential matrix subsumes information not only about the relative rotation estimate but also about the relative translation estimate $\hat{t}_{ij}$. Thus, such translation estimate may be excluded from downstream operations.

Moreover, since the epipolar geometry is computed using image points, all the corresponding points between the pair of local reference frames (i,j) for each identified outlier can be removed. In other words, all information related to the pair (i,j), such as $\hat{R}_{ij}$, $\hat{t}_{ij}$, and the corresponding points, can be assumed to be wrong and removed. For example, the pair (i,j) can be treated as missing.

Thus, FIGS. 6 and 7 provide novel methods for determining absolute rotations where some of the estimates $\hat{R}_{ij}$ of the theoretical relative rotations $R_{ij}$ are missing. In particular, novel cost functions based on low-rank and sparse matrix decompositions and novel algorithms for solving cost function minimization problems are provided.

Referring again to the example structure-from-motion pipeline of FIG. 2, after the absolute rotations are computed at 208, then at 210 estimates of the absolute translations of the cameras can be computed. For example, the absolute translations can be computed based on the calibration matrices, absolute rotations, and the matching points between images.

Various different techniques for estimating absolute translations can be implemented at 210. In some implementations, as mentioned above, data associated with camera pairs for which an outlying relative rotation estimate has been identified will be disregarded or otherwise not provided as input for the absolute translation estimation process at 210.

At 212 the scene structure can be computed. For example, computation of scene structure can include computation of the projection matrices of the cameras, tracking of correspondences through the images, and/or computation of the scene structure (3D coordinates of key-points) by triangulation. Various different techniques for computing scene structure can be performed at 212 and data associated with identified outliers may be disregarded at 212, as well.

At 214 the quality of the structure and motion estimations can be improved. As an example, the global structure and translations can be refined with a partial bundle adjustment with fixed rotations. The quality of structure and motion estimation can then be improved with a global bundle adjustment. At each step of bundle adjustment, image points with high reprojection error can be removed through use of the X84 rejection rule.

At 216 the camera motion (i.e. absolute rotations and translations) and scene structure can be output. For example, the scene structure can be provided in the form a 3D model of the scene such as, for example, a 3D point cloud that approximates structures depicted in the scene. In some implementations, further operations can be performed to refine or otherwise further generate the model. For example, marching cubes or other techniques can be performed to construct a surface from the point cloud.

At 218 a 2D or 3D rendering of the 3D model can be displayed. For example, the 3D point cloud can be rendered in 2D on a display of a computing device. The rendering can be interactive (e.g. rotatable, zoomable, etc.). In further implementations, 3D printing or other techniques may be performed to transform the 3D model into a tangible structure. As another example, the model of the scene can be integrated into a larger scale (e.g. world-scale) model or provided as a feature of an interactive map.

Thus, FIG. 2 provides one example structure-from-motion pipeline 200 which employs novel aspects of the present disclosure to compute absolute rotations based on relative rotation estimates. In particular, due to use of the novel cost functions of the present disclosure, the pipeline 200 can naturally handle both outliers and missing data, without requiring expensive outlier identification preprocessing. Further, outliers can in fact be identified through analysis of the corresponding sparse matrix and can their detrimental effects on downstream operations can be prevented.

Figure 8:
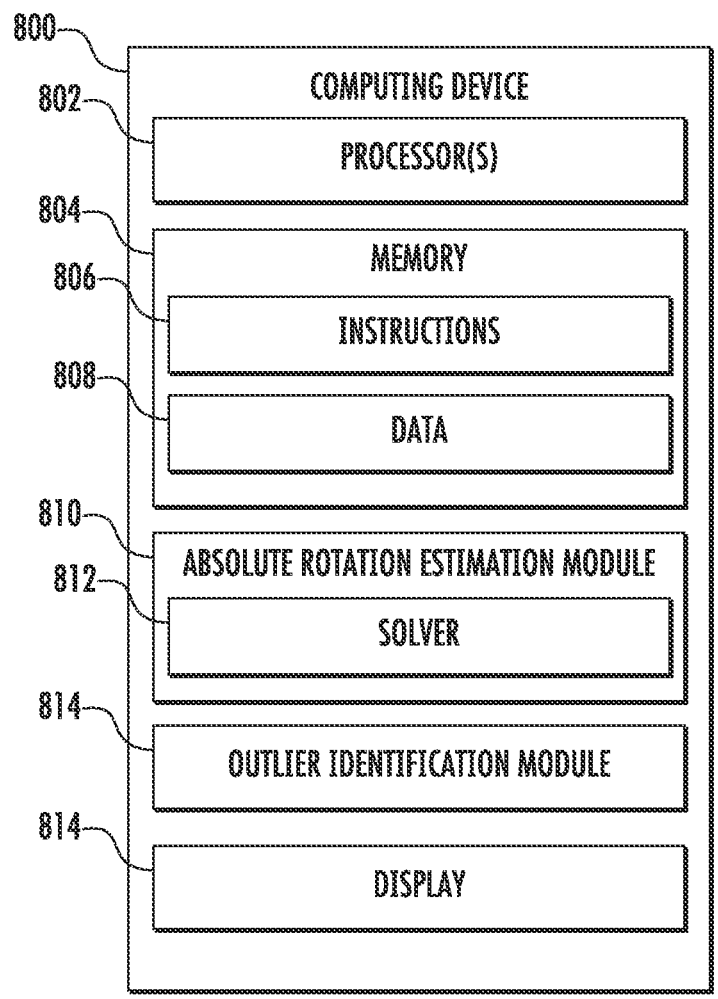
FIG. 8 shows a block diagram of an example computer system to determine absolute rotations, according to an example embodiment of the present disclosure.
Figure 9B:
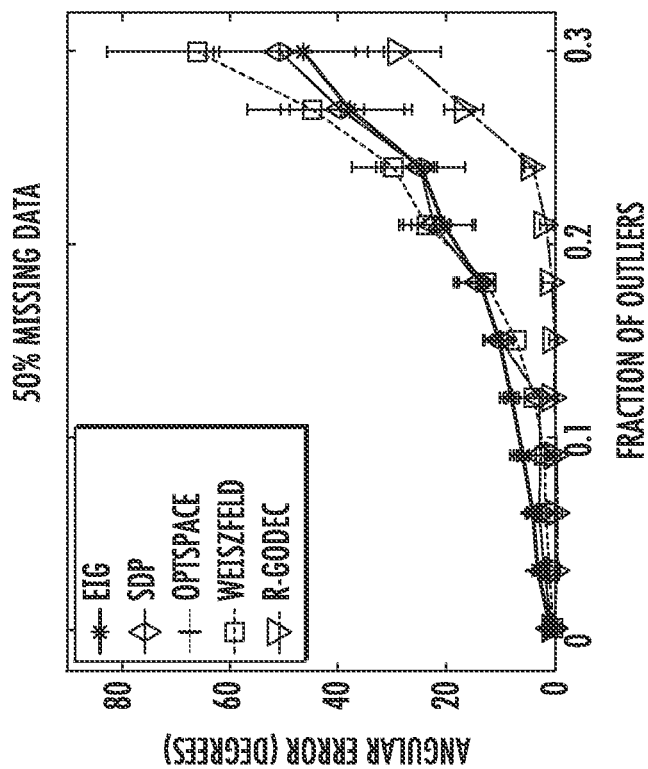
FIGS. 9A-D show graphs of the accuracy of results obtained by performing various absolute rotation estimation techniques on synthetic data having known characteristics.
Figure 9A:
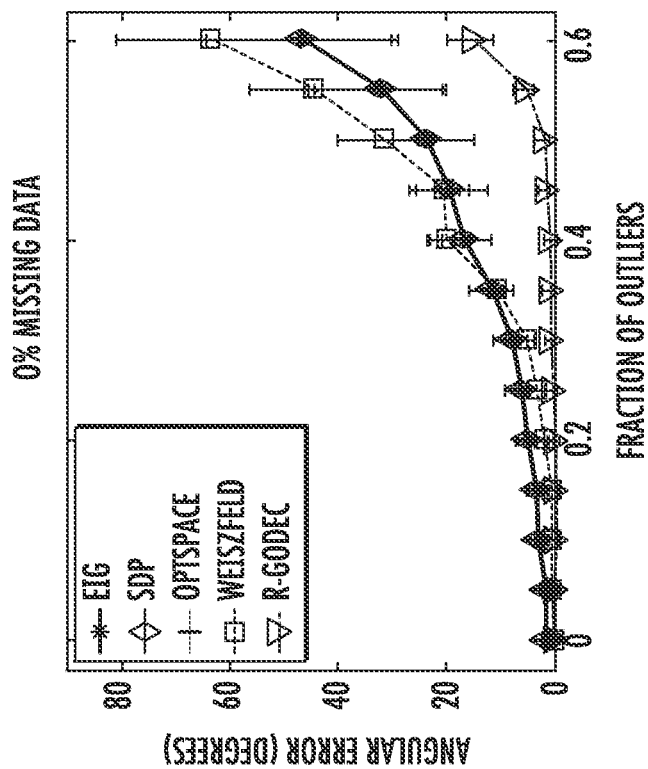
Figure 9D:
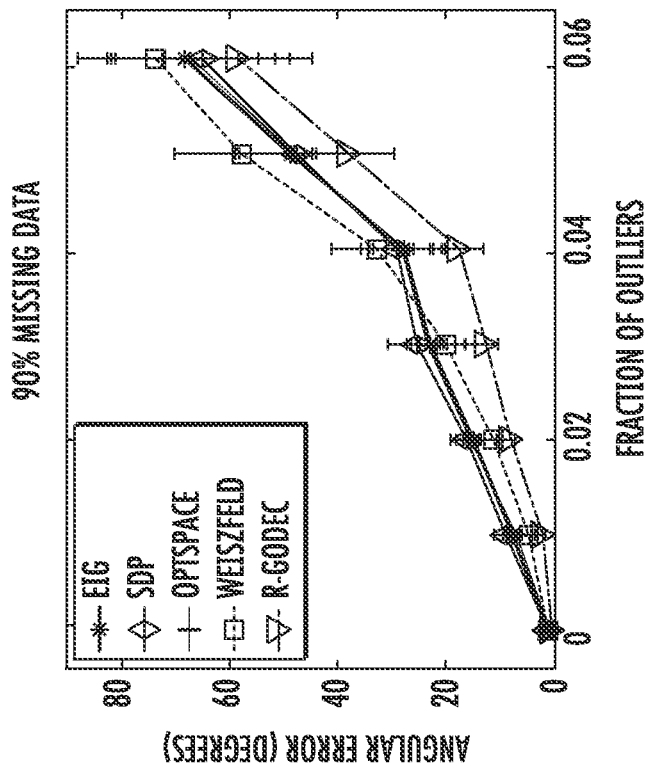
Figure 9C:
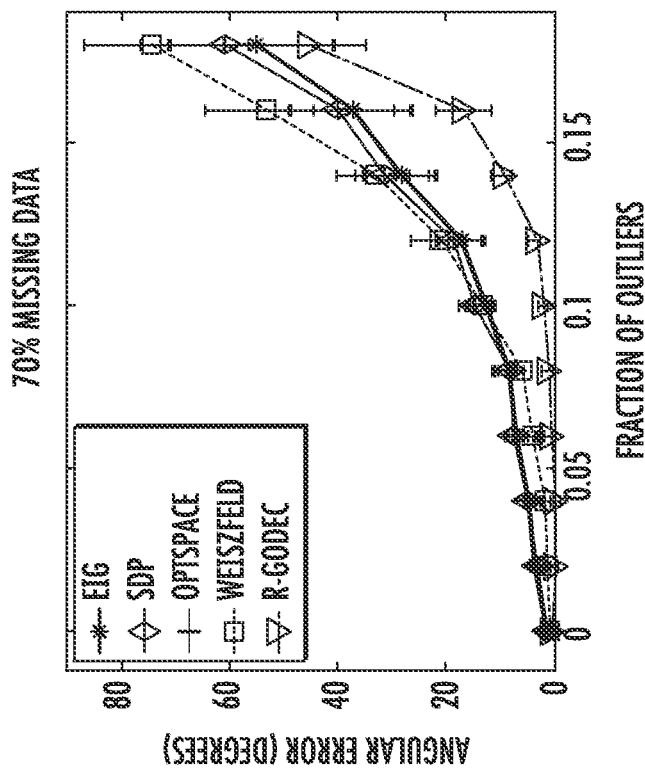

FIG. 8 shows a block diagram of an example computer system to determine absolute rotations, according to an example embodiment of the present disclosure. The system includes a computing device 800. The computing device 800 can be any suitable computing device, including, for example, a personal computer, a workstation, one or more networked server computing devices, an embedded computing device, a mobile device such as smartphone or tablet, other computing devices, or some combination thereof.

The computing device 800 can include a processor 802 and a memory 804. The processor 802 can be one processor or a plurality of processors that are operatively coupled. The processor 802 can be any processing device, such as a microprocessor, microcontroller, integrated circuit, circuitry that implements computer logic, or some combination thereof. The memory 804 can include any information storage device, including, but not limited to, RAM, ROM, hard drives, flash drives, optical media, other memory devices, or some combination thereof. The memory 804 can store information accessible by processor 802, including instructions 806 that can be executed by processor 802. The instructions 806 can be any set of instructions that when executed by the processor 802, cause the processor 802 to perform desired operations. The memory 804 can also store data 808, including, for example, imagery, calibration matrices, matrix values, scene structure, etc.

The computing device 800 can further include an absolute rotation estimation module 810. The computing device 800 can implement the absolute rotation estimation module 810 to determine an absolute rotations matrix that includes a plurality of absolute rotations. As an example, the computing device 800 can implement the absolute rotation estimation module 810 to perform some or all of methods 400, 500, 600, and 700 of FIGS. 4, 5, 6, and 7, respectively.

As used herein, the term module refers to computer logic utilized to provide desired functionality. Thus, a module can be implemented in hardware, firmware, and/or software controlling a general purpose or special purpose processor. In some implementations, each module includes processor-executable instructions stored in or loaded into memory 804 and executed by processor 802. In other implementations, each module includes one or more circuits (e.g., integrated circuits), logic components, or other items of computer hardware configured to implement computer logic or perform other functionality. In yet other implementations, each module includes some combination of processor-executable instructions and circuitry.

The computing device 800 can further include a solver 812. In some implementations, the solver 812 is a subcomponent of the absolute rotation estimation module 810, as shown in FIG. 8. In other implementations, the solver 812 is a stand-alone component of computing device 800 or may be remotely accessed by computing device 800 over a network.

The computing device 800 can implement the solver 812 to solve problems, such as, for example, cost function minimization problems. As an example, computing device 800 can implement solver 812 to perform some or all of methods 500 and 700 of FIGS. 5 and 7, respectively. However, the solver 812 may be capable of performing other algorithms or techniques for solving problems as well. For example, solver 812 may employ various techniques or mathematical procedures to solve problems, including, as examples, SVD, bilateral random projections (BRP), soft-thresholding, other techniques, or some combination thereof.

The computing device 800 can further include an outlier identification module 814. The computing device 800 can implement the outlier identification module 814 to identify one or more outlying relative rotations estimates. As an example, computing device 800 can implement outlier identification module to perform some or all of 408 of FIG. 4 and/or 608 of FIG. 6, including, for example, preventing data associated with identified outliers from impacting downstream operations.

The computing device 800 can further include a display 816. Computing device 800 can present or otherwise show a rendering of a 3D model on the display 816. The display 816 can be any display device including, for example, a monitor, a screen, a holographic display, a projection display, a 3D display, etc.

Due to the inherent flexibility of computer-based systems, a great variety of possible configurations, combinations, and divisions of tasks and functionality between and among the components of the computing device 800 are possible. For instance, computing device 800 can be a single computing device or multiple computing devices. Tasks discussed as being performed by a certain component can instead be performed at other components. Any combination of general-purpose and special-purpose computing devices can be used.

FIGS. 9A-D, 10A-D, and 11A-B show experimental results obtained from analyzing various aspects of the performance of the R-GoDec algorithm and other absolute rotation estimation techniques.

In particular, FIGS. 9A-D show graphs of the accuracy of results obtained by performing various absolute rotation estimation techniques on synthetic data having known characteristics. The data shown in FIGS. 9A-D represents an average over 30 trials.

In particular, the synthetic data is derived from N=100 rotation matrices representing the ground truth orientations for 100 local reference frames. The relative rotations between local reference frames were perturbed with Gaussian noise with SNR of 30 dB, corresponding to a mean angular error of two degrees. These noisy matrices were then projected onto SO(3).

A realistic case was then considered in which a fraction p of the relative rotations is missing (drawn randomly with the constraint that the resulting epipolar graph remains connected). The rest of the pairwise orientations are either true rotations corrupted by noise or drawn uniformly from SO(3), thereby simulating outliers. The cases of p=0 (no missing relative rotations), p=0.5, p=0.7, and p=0.9 were considered.

Various different absolute rotation estimation techniques were performed with respect to the synthetic data. In particular, the R-GoDec algorithm of the present disclosure was compared with a spectral decomposition technique (EIG), a semidefinite programming technique (SDP), a matrix completion algorithm OptSpace, and an implementation of the Weiszfeld algorithm.

The value of $\lambda$ was set to 0.05 for the cases where p=0 and p=0.5, set to 0.1 for the case where p=0.7, and set to 0.15 in the case of p=0.9. Indeed, if the data matrix is highly incomplete, it is preferable to choose a higher value for $\lambda$, in order to give more importance to the outlier term $S_1$ rather than the completion term $S_2$.

The y-axis of the graphs of FIGS. 9A-D represents angular error values, while the x-axis represents fraction of outliers included in the test data. In particular, the accuracy of rotation recovery for each technique was evaluated using the angular distance between the ground truth and the absolute rotations estimated by such technique. The angular distance between two rotations A and B is defined by equation (12) below.

$$d_\angle(A,B)=d_\angle(BA^T,I)=1/\sqrt{2}\|\log(BA^T)\|_2 \qquad (12)$$

As shown in FIGS. 9A-D, the R-GoDec algorithm of the present disclosure performs significantly better than the other analyzed state-of-the-art techniques. In the cases p=0, 0.5, or 0.7, when outliers do not exceed inliers (the second to last data point corresponds to 50% of effective outliers), the error of R-GoDec remains almost constant, showing no sensitivity to outliers. When the percentage of outliers exceeds that of inliers, the error starts to grow, which suggests empirically that R-GoDec might have a 0.5 breakdown point.

On the contrary, the Weiszfeld algorithm, which belongs to the category of robust methods together with R-GoDec has a 0.3 breakdown point. Indeed, by using the L1-norm in place of the L2-norm, as is done in some approaches of the present disclosure, the influence of outliers is reduced but not cancelled.

The standard deviation of R-GoDec is also very small, as compared with the other methods. Furthermore, R-GoDec outperforms all the analyzed techniques in the most challenging situation of a highly incomplete data matrix (p=0.9).

Thus, the R-GoDec algorithm of the present disclosure consistently provides more accurate estimation of absolute rotations than other state-of-the-art techniques, especially in the presence of outliers and missing data. Therefore, the R-GoDec algorithm represents a significant technical advance over existing techniques.

The outlier detection techniques provided by the present disclosure were also subjected to experiments. In particular, FIGS. 10A-D show graphs of receiver operating characteristic (ROC) curves for the outlier detection techniques of the present disclosure. In particular, results for different percentages of missing data and outliers are shown.

Figure 10A:
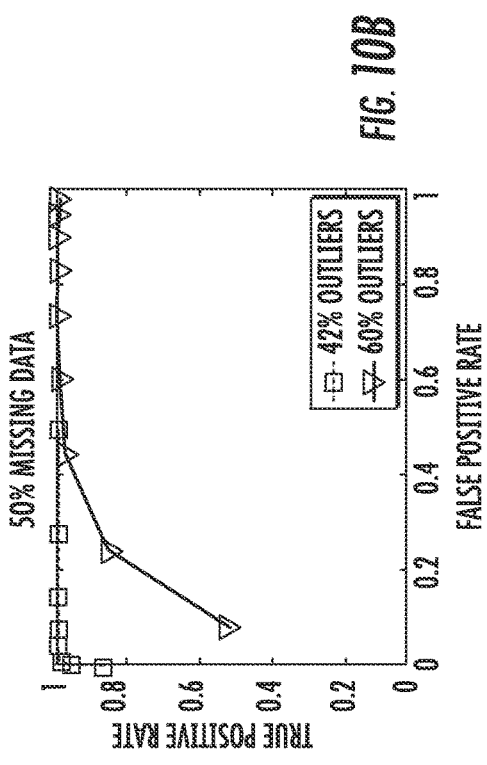
FIGS. 10A-D show graphs of receiver operating characteristic (ROC) curves for the outlier detection techniques of the present disclosure.
Figure 10B:
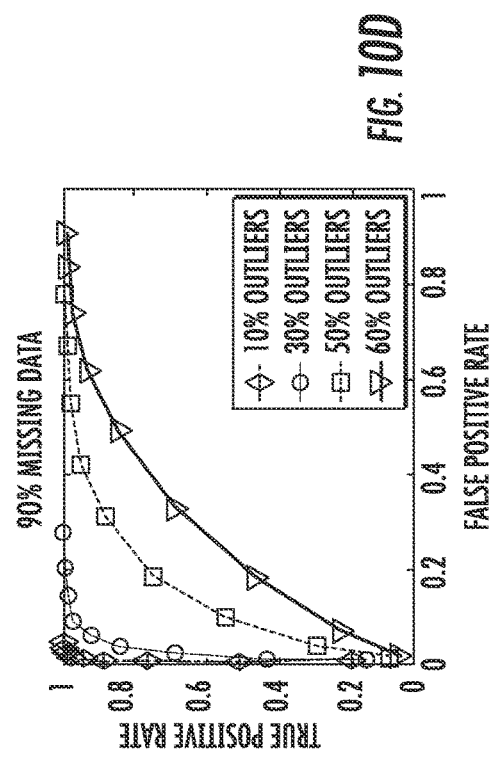
Figure 10C:
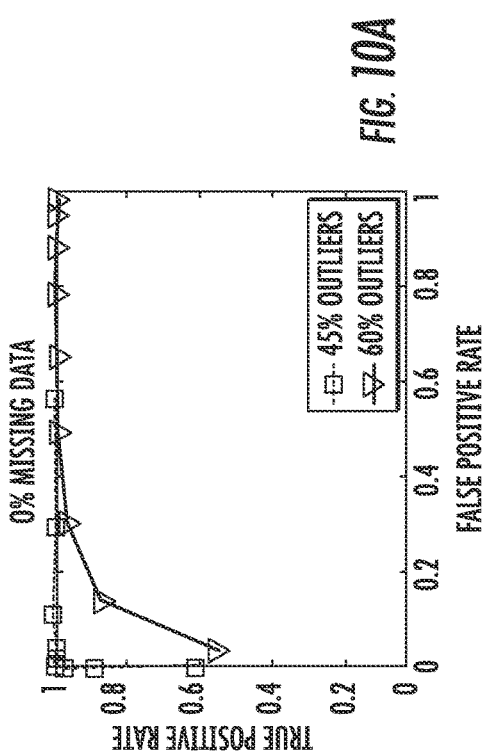
Figure 10D:
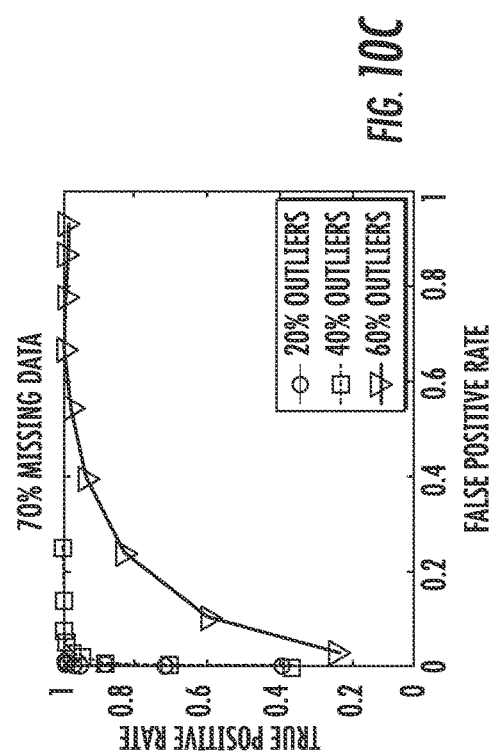

As shown in FIG. 10B, even with up to 50% missing data, the outlier detection techniques of the present disclosure give a perfect classification, as confirmed by the area under the ROC curve which is equal to 1. This does not hold for the curves marked with triangles, which refer to the extreme case of 60% outliers, which is beyond the breakdown point of R-GoDec. However, also in this case a fairly good classification can be appreciated.

Although the outlier detection of the present disclosure becomes less accurate as the fraction of outliers increases, relatively strong performances are still maintained in the case of a highly incomplete data matrix.

Figure 11B:
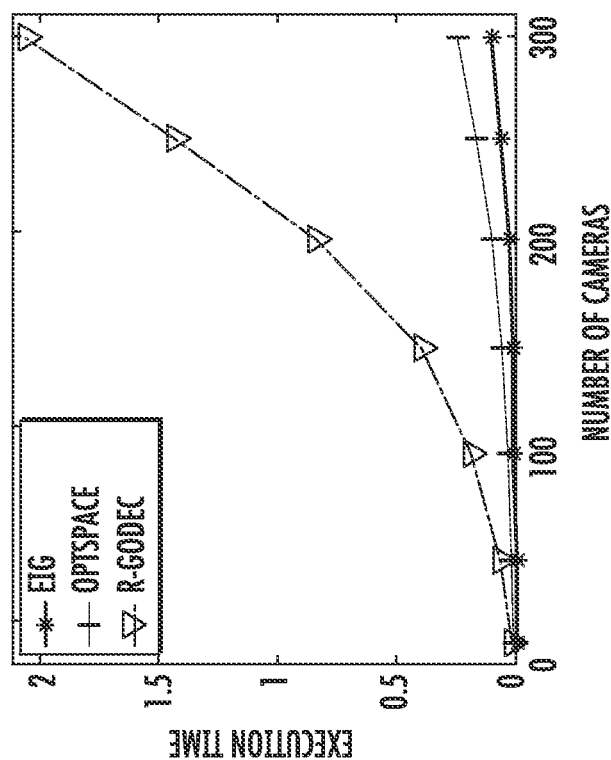
FIGS. 11A-B show graphs of execution time versus number of cameras for different absolute rotation estimation techniques.
Figure 11A:
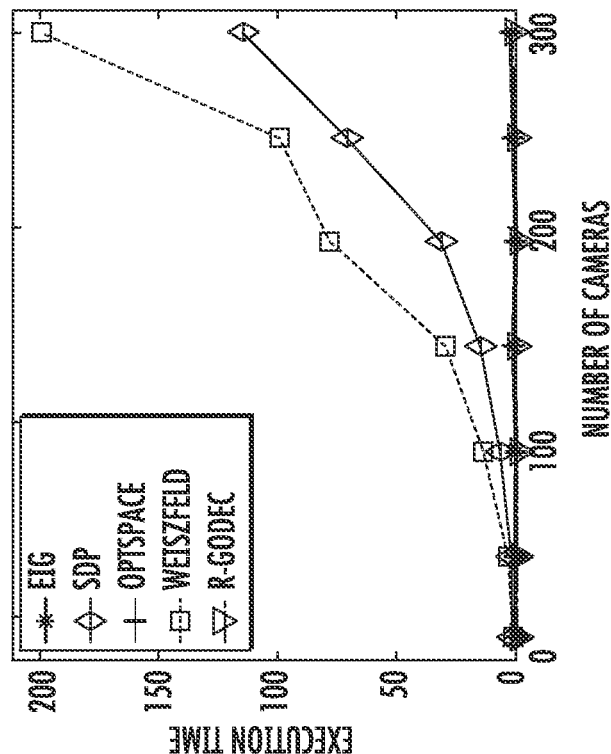

FIGS. 11A-B show graphs of execution time versus number of cameras for different absolute rotation estimation techniques. In particular, FIGS. 11A-B show the running time of various absolute rotation estimation algorithms for different values N of local reference frames. FIG. 11B is a zoomed in portion of FIG. 11A.

The execution cost shown includes both operations on the data matrix and the subsequent projection onto SO(3). The R-GoDec algorithm is comparable to spectral decomposition (EIG) and the OptSpace algorithm, neither of which, however, are robust. The R-GoDec algorithm is significantly faster than the Weiszfeld technique and SDP.

With concurrent reference to FIGS. 9A-D and FIGS. 11A-B, it can be seen that the R-GoDec algorithm provides enhanced accuracy and robustness with minimal computational cost trade-off.

Thus, the techniques of the present disclosure provide enhanced accuracy and robustness of absolute rotation estimation while maintaining a comparable computational speed with less robust state-of-the-art techniques. Such enhanced performance has been shown to be consistent across all percentages of outliers, percentages of missing data, and number of local reference frames. Further, the outlier detection techniques of the present disclosure have been shown to provide strong classification even in the face of significant missing data. Therefore, the systems and methods of the present disclosure represent a significant technical advance over existing techniques.

The various embodiments described above can be combined to provide further embodiments. The methods or algorithms set out herein may employ additional acts, may omit some acts, and/or may execute acts in a different order than specified.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating, using image processing circuitry, matching points of pairs of images of a set of images of a stationary scene;
generating, using the image processing circuitry, a relative rotation estimates matrix that includes a plurality of relative rotation estimates, wherein each of the plurality of relative rotation estimates is an estimate of a relative rotation between attitudes of two of a plurality of local reference frames, each local reference frame being associated with one of the images of the set of images of the stationary scene;
generating, using the image processing circuitry, values of a first matrix of a cost function that is based on a low-rank and sparse matrix decomposition of the relative rotation estimates matrix, the cost function including the first matrix and a sparse matrix that is nonzero in correspondence of one or more outliers of the plurality of relative rotation estimates;
generating, using the image processing circuitry, an absolute rotations matrix that includes a plurality of absolute rotations based at least in part on the values of the first matrix of the cost function, wherein each of the plurality of absolute rotations is a rotation between the attitude of one of the local reference frames and a global reference frame; and
generating, using the image processing circuitry, an image scene structure based on the absolute rotations matrix.

2. The method of claim 1, wherein the first matrix of the cost function is of rank 3.

3. The method of claim 2, wherein the cost function comprises a squared Frobenius norm of the relative rotation estimates matrix minus the first matrix minus the sparse matrix.

4. The method of claim 3, wherein:
the cost function comprises a first cost function; and
the generating values for the first matrix of the first cost function comprises performing a plurality of minimization iterations, each minimization iteration including:
assigning to the first matrix of the cost function a rank-3 approximation of the relative rotation estimates matrix minus the sparse matrix; and
determining values for the sparse matrix based on a second cost function, the second cost function being a coefficient times the first cost function plus a regularization parameter times an L1-norm of the sparse matrix viewed as a vector.

5. The method of claim 4, wherein the determining values for the sparse matrix based on the second cost function comprises soft thresholding the relative rotation estimates matrix minus the first matrix of the first cost function.

6. The method of claim 2, wherein:
the sparse matrix that is nonzero in correspondence of the one or more outliers of the plurality of relative rotation estimates comprises a first sparse matrix that is nonzero in correspondence of the one or more outliers of the plurality of relative rotation estimates; and
the cost function further includes a second sparse matrix that is nonzero in correspondence to one or more missing entries from the relative rotation estimates matrix.

7. The method of claim 6, wherein the cost function comprises a squared Frobenius norm of the relative rotation estimates matrix minus the first matrix of the cost function minus the first sparse matrix minus the second sparse matrix.

8. The method of claim 7, wherein:
the first sparse matrix is supported on a subset or an equivalent of a sampling set, the first sparse matrix being sparse over the sampling set; and
the second sparse matrix is supported on a compliment of the sampling set.

9. The method of claim 8, wherein the generating the values for the first matrix of the cost function comprises performing a plurality of minimization iterations, each minimization iteration including:
assigning to the first matrix of the cost function, a rank-3 approximation of the relative rotation estimates matrix minus the first sparse matrix minus the second sparse matrix;
assigning to the first sparse matrix a result of soft thresholding a first projection of the relative rotation estimates matrix minus the first matrix of the cost function over the sampling set; and
assigning to the second sparse matrix a negative of a second projection of the first matrix of the cost function over the compliment of the sampling set.

10. The method of claim 9, wherein assigning to the first matrix of the cost function the rank-3 approximation of the relative rotation estimates matrix minus the first sparse matrix minus the second sparse matrix comprises:
computing the rank-3 approximation of the relative rotation estimates matrix minus the first sparse matrix minus the second sparse matrix using a bilateral random projections (BRP) technique; and
assigning to the first matrix of the cost function, the computed rank-3 approximation.

11. The method of claim 1, wherein the generating the absolute rotations matrix that includes the plurality of absolute rotations based at least in part on the values of the first matrix of the cost function comprises using as the absolute rotations matrix one of a plurality of block-columns of the values of the first matrix of the cost function.

12. The method of claim 11, wherein using as the absolute rotations matrix one of a plurality of block-columns of the values of the first matrix of the cost function comprises performing a singular value decomposition (SVD) technique with respect to one or more of the values of the used one of the plurality of block-columns of the values of the first matrix of the cost function to respectively determine a nearest rotation matrix for such one or more values.

13. The method of claim 1, further comprising analyzing, using the image processing circuitry, the sparse matrix after determining the values of the first matrix of the cost function to identify the one or more outliers of the plurality of relative rotation estimates.

14. The method of claim 13, wherein analyzing the sparse matrix after determining the values of the first matrix of the cost function to identify the one or more outliers of the plurality of relative rotation estimates comprises identifying as an outlier each relative rotation estimate for which a corresponding three by three block in the sparse matrix includes greater than a threshold number of nonzero entries.

15. The method of claim 13, comprising disregarding, for two local reference frames respectively associated with each of the one or more outliers of the plurality of relative rotation estimates, one or more of a relative translation estimate, the relative rotation estimate, and one or more image points between such two local reference frames.

16. A system, comprising:
one or more memories; and
at least one processor coupled to the one or more memories, wherein the at least one processor, in operation:
  generates matching points of pairs of images of a set of images of a stationary scene;
  generates a relative rotation estimates matrix that includes a plurality of relative rotation estimates, wherein each of the plurality of relative rotation estimates is an estimate of a relative rotation between attitudes of two of a plurality of local reference frames, each local reference frame being associated with one of the images of the set of images of the stationary scene;
  generates values of a first matrix of rank 3 of a cost function that includes the first matrix and a sparse matrix that is nonzero in correspondence of one or more outliers of the plurality of relative rotation estimates;
  generates an absolute rotations matrix comprising a plurality of absolute rotations based at least in part on the values of the first matrix of the cost function, wherein each of the plurality of absolute rotations is a rotation between the attitude of one of the local reference frames and a global reference frame; and
  generates an image scene structure based on the absolute rotations matrix.

17. The system of claim 16, wherein the cost function comprises a squared Frobenius norm of the relative rotation estimates matrix minus the first matrix of the cost function minus the sparse matrix.

18. The system of claim 17, wherein:
the cost function comprises a first cost function; and
the at least one processor generates values for the first matrix of rank 3 of the first cost function by, for each of a plurality of minimization iterations:
  assigning to the first matrix a rank-3 approximation of the relative rotation estimates matrix minus the sparse matrix; and
  determining values for the sparse matrix based on a second cost function, the second cost function being one-half the first cost function plus a regularization parameter times an L1-norm of the sparse matrix viewed as a vector.

19. The system of claim 18, wherein the determining values for the sparse matrix based on the second cost function includes soft thresholding the relative rotation estimates matrix minus the first matrix of the cost function.

20. The system of claim 16, wherein:
the sparse matrix that is nonzero in correspondence of the one or more outliers of the plurality of relative rotation estimates comprises a first sparse matrix that is nonzero in correspondence of the one or more outliers of the plurality of relative rotation estimates; and
the cost function includes a second sparse matrix that is nonzero in correspondence to one or more missing entries from the relative rotation estimates matrix.

21. The system of claim 20, wherein the cost function comprises a squared Frobenius norm of the relative rotation estimates matrix minus the first matrix of the cost function minus the first sparse matrix minus the second sparse matrix.

22. The system of claim 21, wherein:
the first sparse matrix is supported on a subset or an equivalent of a sampling set, the first sparse matrix being sparse over the sampling set; and
the second sparse matrix is supported on a compliment of the sampling set.

23. The system of claim 22, wherein the at least one processor to, in operation:
  assigns to the first matrix of the cost function a rank-3 approximation of the relative rotation estimates matrix minus the first sparse matrix minus the second sparse matrix;
  assigns to the first sparse matrix a result of soft thresholding a first projection of the relative rotation estimates matrix minus the first matrix of the cost function over the sampling set; and
  assigns to the second sparse matrix a negative of a second projection of the first matrix of the cost function over the compliment of the sampling set.

24. The system of claim 16, wherein the at least one processor, in operation, identifies as an outlier each relative rotation estimate for which a corresponding three by three block in the sparse matrix includes greater than a threshold number of nonzero entries after determination of the values of the first matrix of rank 3 of the cost function.

25. A method, comprising:
generating, using at least one processor, a relative rotation estimates matrix comprising a plurality of relative rotation estimates, each of the plurality of relative rotation estimates being an estimate of a relative rotation between attitudes of two of a plurality of local reference frames, each of the local reference frames being associated with an image of a set of images of a stationary scene;
setting, using the at least one processor, a first matrix of a cost function equal to the relative rotation estimates matrix;
initializing, using the at least one processor, a first sparse matrix to zero, the first sparse matrix being representative of one or more outliers of the plurality of relative rotation estimates;
initializing, using the at least one processor, a second sparse matrix to zero, the second sparse matrix being representative of one or more missing entries from the relative rotation estimates matrix;

performing, using the at least one processor, a plurality of iterations while an iteration continuation condition is satisfied, each of the plurality of iterations comprising:

assigning, using the at least one processor, to the first matrix a rank-3 approximation of the relative rotation estimates matrix minus the first sparse matrix minus the second sparse matrix;

assigning, using the at least one processor, to the first sparse matrix a result of applying soft thresholding to a projection of the relative rotation estimates matrix minus the first matrix of the cost function over a sampling set; and assigning, by the at least one processor, to the second sparse matrix a negative of a projection of the first matrix of the cost function over a compliment of the sampling set;

generating, using the at least one processor, an absolute rotations matrix comprising a plurality of absolute rotations based at least in part on one or more values of the first matrix of the cost function after performing the plurality of iterations, each of the plurality of absolute rotations comprising a rotation between the attitude of one of the local reference frames and a global reference frame; and generating, using the at least one processor, an image scene structure based on the absolute rotations matrix.

26. The method of claim 25, wherein:

the first matrix of the cost function has a rank of less than or equal to three;

the first sparse matrix has support on a subset or an equivalent of the sampling set; and the second sparse matrix has support on the compliment of the sampling set.

27. The method of claim 25, comprising:

identifying, using the at least one processor, as an outlier each relative rotation estimate for which a corresponding three by three block in the first sparse matrix includes greater than a threshold number of nonzero entries after performing the plurality of iterations.

* * * * *